United States Patent [19]
VanCleve et al.

[11] Patent Number: 5,969,265
[45] Date of Patent: Oct. 19, 1999

[54] CORIOLIS FLOWMETER HAVING ITS FLOW CALIBRATION FACTOR INDEPENDENT OF MATERIAL DENSITY

[75] Inventors: Craig Brainerd VanCleve, Lyons; Charles Paul Stack, Louisville; Gregory Treat Lanham, Longmont, all of Colo.

[73] Assignee: Micro Motion, Inc., Boulder, Colo.

[21] Appl. No.: 09/144,030

[22] Filed: Aug. 31, 1998

Related U.S. Application Data

[63] Continuation-in-part of application No. 09/108,294, Jul. 1, 1998.

[51] Int. Cl.⁶ .................................................. G01F 1/84
[52] U.S. Cl. ............................ 73/861.357; 73/861.355
[58] Field of Search ..................... 73/861.355, 861.356, 73/861.357

[56] References Cited

U.S. PATENT DOCUMENTS

| | | | |
|---|---|---|---|
| 4,823,614 | 4/1989 | Dahlin ................................ | 73/861.357 |
| 5,044,207 | 9/1991 | Atkinson et al. ..................... | 73/861.37 |
| 5,054,326 | 10/1991 | Mattar ................................ | 73/861.38 |
| 5,398,554 | 3/1995 | Ogawa et al. ....................... | 73/861.38 |
| 5,497,665 | 3/1996 | Cage et al. .......................... | 73/861.38 |
| 5,531,126 | 7/1996 | Drahm ................................ | 73/861.356 |
| 5,616,868 | 4/1997 | Hagenmeyer et al. ............... | 73/861.357 |
| 5,691,485 | 11/1997 | Endo et al. .......................... | 73/861.357 |
| 5,796,012 | 8/1998 | Gomi et al. ......................... | 73/861.357 |

*Primary Examiner*—Harshad Patel
*Attorney, Agent, or Firm*—Duft, Graziano & Forest, P.C.

[57] ABSTRACT

A single tube Coriolis flowmeter of enhanced flow sensitivity in which material flow induces Coriolis deflections in a flow tube and Coriolis-like deflections in a balance bar vibrationally coupled to the flow tube. Both the Coriolis deflections and the Coriolis-like deflections have a phase shift determined by material flow and are used co-adjuvantly to derive material flow information. The flowmeter achieves a constant flow sensitivity over a range of changes in material density by 1) varying the flow sensitivity in a first direction under control of the ratio between the drive mode vibration amplitude of the flow tube and the balance bar and 2) varying the flow sensitivity in an opposite direction under control of the ratio between the Coriolis deflection amplitude of the flow tube and the Coriolis-like deflection of the balance bar. The drive mode vibration amplitude ratio varies with changes in drive mode frequency caused by changes in material density. The amplitude ratio of the Coriolis defection and the Coriolis-like deflection changes with changes in the magnitude of the separation of the drive mode frequency and the second bending mode frequency to the balance bar density which, in turn, is caused by changes in material density.

36 Claims, 13 Drawing Sheets

CORIOLIS FLOWMETER HAVING ITS FLOW CALIBRATION FACTOR INDEPENDENT OF MATERIAL DENSITY

RELATED APPLICATION

This application is a continuation in part of U.S. application Ser. No. 09/108,294 filed Jul. 1, 1998, and whose disclosure is hereby incorporated by reference to the same extent as fully set forth herein.

FIELD OF THE INVENTION

This invention relates to a single tube Coriolis flowmeter and in particular, to a Coriolis flowmeter having a flow calibration factor that is independent of material density.

Problem

Single tube Coriolis flowmeters are desirable because they eliminate the expense and the plugging problems of flow splitting manifolds of dual tube Coriolis flowmeters. Prior art single tube Coriolis flowmeters have a disadvantage in that as the density of the measured material changes, the calibration or flow sensitivity of the meter changes. It is desired that a flowmeter generate accurate output information, such as mass flow rate, regardless of the density of the material flow. Thus, if a flowmeter accurately outputs a mass flow rate reading of 10 lbs/minute for a material having a specific gravity of 1.0 (water), it is desired that the meter accurately output a reading of 10 lbs/minute for the same mass flow rate for material flows of other densities.

A flowmeter that has this capability is said to have a calibration factor that is independent of the density of its material flow, or a flat calibration factor. Such a flowmeter is also said to have a constant flow sensitivity in that it accurately outputs the same mass flow rate regardless of the density of the material flow. Sensitivity (s) is defined as microseconds of time delay between the velocity sensors of the flow meter divided by the mass flow rate $$\left(s = \frac{\Delta t}{\dot{M}}\right)$$

where $\Delta t$ equals the time difference from the velocity sensors of the flowmeter and where $$\dot{M}$$

equals mass flow rate. Thus, for a meter to have a flat calibration factor or a constant flow sensitivity, this expression has to have a constant value for any flow rate and any material density. It would provide, for example, an output of one microsecond of time delay for a flow rate of 10 lbs/minute regardless of material density and would provide an output of 10 microseconds time delay for a flow rate of 100 lbs/minute regardless of material density. In both cases the meter sensitivity is 0.1 microsecond/lb./min. A flowmeter having the above characteristics would be advantageous in that it would eliminate or minimize the need for further calibration or compensation.

Flowmeter change in calibration or flow sensitivity has traditionally been minimized by use of massive counter balance members (henceforth known as balance bars). Any remaining change in sensitivity with density has been compensated by use of correction algorithms based on the resonant frequency of the meter in its drive mode. The use of massive balance bars has disadvantages in cost as well as in preventing the use of other performance enhancing features such as sensitivity enhancing balance bars. A correction algorithm has the disadvantage that it must be calibrated using material of differing density and it must be executed in software. The present invention eliminates the need for a massive balance bar and a correction algorithm by a unique design of the balance bar. In order to understand this design, it is first necessary to understand how traditional Coriolis flowmeters operate.

In traditional dual tube Coriolis flowmeters, the flow tubes are vibrated out of phase with each other. The dual flow tubes act as a counterbalance to each other to create a dynamically balanced structure. Velocity sensors are located at two locations along the flow tubes to sense the relative velocity between the flow tubes. The velocity sensors are usually located equal distances upstream and downstream from the tubes' midpoints. Each velocity sensor consists of a magnet fastened to one flow tube and a coil fastened to the other. The relative motion of the coil through the magnetic field produces a voltage. The sinusoidal motion of the vibrating flow tubes produces a sinusoidal voltage in each sensor. When there is no material flow, the voltages from the two velocity sensors are in phase with each other. With material flow, the vibrating tubes are distorted by the Coriolis force of the moving material to cause a phase difference between the two sensor voltages. The mass flow rate is proportional to this phase difference. It is important to note that both flow tubes are distorted equally (for an equal division of flow) and each flow tube has the same phase shift as the other at corresponding locations. The upstream sensor magnet velocity has the same phase as the upstream coil velocity and both have the same phase as the voltage generated by the magnet-coil sensor pair. The downstream sensor has a different phase than the upstream but again, the coil on one tube has the same phase as the magnet on the other. To determine the time delay, $\Delta t$, the phase delay between the two velocity sensors is divided by the drive frequency (in radians/sec). Dividing the time delay by the meter sensitivity gives the flow rate.

In single tube flowmeters, the vibrating flow tube is counterbalanced by a balance bar rather than another flow tube. Velocity sensor magnets (or coils) are mounted to the balance bar as though it were the second flow tube described above. However, since material does not flow through the balance bar, it does not experience any Coriolis force or significant phase shift with flow. The velocity sensors sense the relative velocity between the phase shifted flow tube and the non-phase shifted balance bar. The flow tube and balance bar velocities at each velocity sensor may be represented by velocity vectors having phase angle and amplitude. The relative velocity (and voltage out of each velocity sensor) can be determined by adding the two velocity vectors. The flow tube velocity vector has a phase shift due to material flow. The balance bar velocity vector has zero phase shift. Adding these vectors gives the net phase shift with flow of the velocity sensor. The net phase shift of the output voltage of each velocity sensor is reduced by the non-phase shifted balance bar. This net phase shift reduction equates to a reduction in the flow sensitivity of the flowmeter.

In traditional single tube flowmeters, the reduction in flow sensitivity is a function of material density. One reason is that as material density changes, the vibration amplitude ratio between the flow tube and the balance bar changes in order to conserve momentum and keep the meter balanced. When the vibration amplitude ratio changes, the lengths of the velocity vectors change. An increase in material density causes the flow tube vibration amplitude to decrease and the balance bar vibration amplitude to increase. Thus, the velocity vectors for the flow tube decrease in length and the velocity vectors for the balance bar increase in length. Since the flow tube velocity vectors have a phase shift due to material flow and the balance bar vectors have none, the changes in length result in a decrease in phase of the sum of the velocity vectors and a decrease in sensitivity of the meter with the increase in material density. As a result, such a meter would have an accurate output of a flow rate of 10 pounds/minute for water, but for salt water (higher density) at the same flow rate the output might be only 9.9 pounds/minute. For a low density material such as kerosine the meter output might be 10.1 pounds/minute. These three different flow readings are all for an actual flow rate of 10 pounds/minute, but because the meter sensitivity changes with material density, the indicated flow rate changes. Such a meter does not have a flat calibration factor or constant flow sensitivity for materials of different densities. The reason for this is that the flowmeter has a different time delay between its sensors for materials of different densities for the same actual flow rate.

There are other reasons for the flow sensitivity of single tube meters to change with material density. One such reason is that the balance of a single tube flowmeter is extremely difficult to maintain under conditions of differing material density. The above discussion of the change in amplitude ratio between the flow tube and the balance bar assumes that perfect balance is maintained between the two by way of the amplitude ratio shift with material density. When the correct amplitude ratio for perfect balance is not achieved, then momentum is conserved by a shift in the location of the nodes at the ends of the vibrating part of the flow tube. This location shift has the effect of transferring mass from the flow tube to the balance bar (for a higher material density) but it also changes the flow sensitivity. The sensitivity increases as the nodes move in toward the pickoffs and decreases as the nodes move outwards away from the pickoffs.

There are also other less understood causes of flow sensitivity shift with material density. The cause, however, does not matter. The present invention can negate the change in sensitivity by creating an additional equal and opposite change in sensitivity so that the net change in sensitivity is eliminated.

Solution

The above and other problems are solved and an advance in the art is achieved by the present invention in accordance with which a single tube Coriolis flowmeter is provided having a balance bar that has a phase shift at its velocity sensors that is proportional to material flow rate. Furthermore the balance bar sensitivity to material flow changes with material density in such a manner so as to cancel the flowmeter change in sensitivity. For example, since the prior art flowmeter becomes less sensitive to flow due to amplitude ratio change as material density increases, the balance bar becomes more sensitive to the Coriolis oscillations of the flow tube at a precisely offsetting rate so that the net result is a flowmeter that is insensitive to material density.

Both in the present invention as well as in prior art single tube Coriolis flowmeters, the balance bar is driven out of phase with respect to the flow tube in the first bending mode. The drive frequency is typically the resonant frequency of both the balance bar and the material filled flow tube in the first bending mode of each. In prior art single tube Coriolis flowmeters the balance bar lacks significant response to the Coriolis forces and Coriolis deflections of the flow tube. In the present invention the balance bar is designed so that it responds to the Coriolis forces on the flow tube by bending in its second bending mode.

With material flow, the vibrating flow tube deflects in response to the applied Coriolis forces. The drive vibrations of the flow tube are substantially greater in amplitude than the Coriolis deflections since the drive vibrations occur at the resonant frequency of the material filled flow tube while the Coriolis deflections are at a frequency far from the resonant frequency of the flow tube for the Coriolis deflection mode shape. The Coriolis forces are applied by the flowing material to the flow tube at the same frequency as the drive vibrations. The Coriolis force induced deflection of the flow tube, however, is of the same shape as the second bending mode. The second bending mode resonant frequency of the flow tube is much higher than the frequency of application of the Coriolis force (the drive frequency). Thus, because the Coriolis force induced deflections are at a frequency far removed from the resonant frequency of its mode shape (the second bending), the Coriolis induced deflections in the flow tube are very much smaller than the driver induced (first bending mode) deflections. The small Coriolis deflections in the second bending mode of the flow tube produce the phase delay between the two velocity sensor signals in response to material flow.

The balance bar of the present invention is connected at its ends to the flow tube by means of brace bars which transmit the vibrational forces of the flow tube to the balance bar. In prior art meters the balance bar, like the flow tube, has its second bending mode resonant frequency much higher than the first bending or drive mode. Since the Coriolis deflections of the flow tube are very small and occur at a frequency far removed from the balance bar second bending resonant frequency, the forces transmitted to the balance bar by way of the brace bars result in no significant excitation of the second bending mode of the balance bar. Thus, in prior art meters the flow tube has little response to the Coriolis forces and the balance bar has none.

The present invention involves shifting the frequency order of the various mode shapes of the balance bar. This can be confusing. Vibration modes are defined according to their shapes, not their frequency order. A useful rule is that the mode number is equal to the number of nodes minus one. The first mode has two nodes (at the ends). The second has three (at the ends and in the center). The third bending mode has four nodes, etc.

In accordance with the present invention, the second bending mode frequency of the balance bar is lowered so that it is close to the first bending mode (drive frequency) of both the flow tube and the balance bar. The first bending (drive) mode which has large vibration amplitude in both the flow tube and the balance bar, fails to excite the balance bar in the second bending mode because of the difference in mode shapes. In the first bending mode the deflected shape of the balance bar (and flow tube) is such that the ends have no displacement while the length between the ends has increasing displacement with the maximum displacement occurring at the center. In the second bending mode the ends and center have no displacement with the maximum displacements occurring at about the one quarter and three quarter length points. However, the sign of the displacement changes at the center point so that one-half of the balance bar (or flow tube) has positive displacement while the other half has negative displacement. The result of the difference in mode shapes is that while the vibration of the first bending mode is putting energy into one half of the balance bar in the second bending mode, it is taking an equal amount of energy out of the other half of the balance bar. Therefore the net effect is that the second bending mode is not excited by vibration in the first bending mode even though the resonant frequencies may be close.

The Coriolis deflection of the flow tube has the same shape as the second bending mode in that the displacement of the flow tube has an opposite sign on either side of the flow tube center point. Thus, the Coriolis deflection of the flow tube is able to excite the second bending mode of the balance bar via the forces transmitted through the brace bars. In the present invention, the second bending mode resonant frequency of the balance bar is made close to the drive frequency. The excitation of the balance bar second bending mode by the Coriolis deflection of the flow tube becomes sufficient to cause significant phase delay in the balance bar at its velocity sensor locations. This phase delay between the balance bar locations adds to the phase delay between the corresponding flow tube locations, and changes flow sensitivity. This change in sensitivity is used to reduce the effect of changes in material density on the meter's flow sensitivity.

In accordance with a first embodiment of the invention, the second bending mode resonant frequency of the balance bar is below the drive frequency of the flow tube and the balance bar. It is well known that when a mechanical oscillator's resonant frequency is below the exciting frequency, the oscillator moves out of phase to the exciting displacement. As a result, the balance bar assumes a deflection that is out of phase with the Coriolis induced deflection on the flow tube. Because the balance bar's excitation source for its second bending mode is the Coriolis deflections of the flow tube, the vibration amplitude of the balance bar's second bending mode deflections increase as the Coriolis force on the flow tube increases. These out of phase Coriolis deflections of the flow tube and second bending mode deflections of the balance bar are additive and permit a velocity sensor coupled to the flow tube and balance bar to generate output signals of increased phase delay (sensitivity) compared to that of prior art single tube Coriolis flowmeters.

The excitation of the second bending mode of the balance bar by the Coriolis deflection of the flow tube is a function of the separation between the excitation frequency (drive frequency) and the resonant frequency of the balance bar in its second bending mode. Small frequency separation results in greater balance bar second bending vibration amplitude for a given flow rate than does a larger frequency separation. The drive frequency changes with changes in material density because the flow tube contains the flowing material while the balance bar's second bending resonant frequency remains relatively constant. Thus the separation between the drive frequency and the balance bar second resonant frequency changes with material density and causes the balance bar's sensitivity to the Coriolis oscillations of the flow tube to change with material density. When the balance bar's second bending mode resonant frequency is below the drive frequency, increases in material density cause the drive frequency to decrease and the frequency separation to decrease with a resultant increase in sensitivity of the balance bar to material flow. By properly sizing the frequency separation, the increase in the balance bar's sensitivity with material density can precisely counter the meter's decrease in sensitivity due to the drive mode vibration amplitude ratio change.

The reduction of the second bending mode frequency of the balance bar below the drive frequency is achieved by a physical re-design of the balance bar that includes a redistribution of its mass and stiffness. Mass is removed from the central portion of the balance bar which tends to raise the drive frequency while having little impact on the second bending mode frequency. The mass removal has little impact on the second bending mode frequency because the second bending mode has little amplitude near the center. Mass is then added to the balance bar near the velocity sensor locations. This lowers the second bending mode frequency more than the drive frequency because these are the locations where the second bending mode vibration amplitude is greatest.

Balance bar stiffness is modified by greatly softening it in the regions of high bending in the second bending mode. These locations are slightly toward the center from the velocity sensor locations. Removing stiffness in these areas greatly reduces the second bending mode frequency while having little effect on the drive frequency since in the drive mode there is little bending in these areas. Finally, stiffness in the central section of the balance bar, between the soft areas, is increased to further raise the drive frequency while having little effect on the second bending frequency.

These physical modifications of the balance bar along with subsequently described changes can reduce its second bending mode frequency so that it is lower than its first bending mode (drive) frequency. When this is achieved, the Coriolis vibrations of the flow tube are transmitted from the flow tube through the brace bars to the ends of the balance bar. This induces the Coriolis like deflections in the balance bar that are out of phase with the Coriolis deflections of the flow tube. These deflections are referred to as "Coriolis like" in that they assume a mode shape that is similar to that of a flow tube being deflected by Coriolis force. The flow tube and balance bar of the present invention thus perform as a dual tube Coriolis flowmeter wherein each of the flow tubes assumes a Coriolis vibratory response that is out of phase with respect to the other flow tube. The result is that the single tube meter of the present invention can have the flow sensitivity of a dual tube meter. Furthermore, because the change in sensitivity due to change in material density is countered by the change in sensitivity of the balance bar, the single tube meter of the present invention has a flow sensitivity that is constant and independent of material density.

The phase of the balance bar second bending mode vibration with respect to the phase of the Coriolis deflection of the flow tube depends upon the relationship of the resonant frequency of the balance bar second bending mode to the first bending mode (drive) frequency in the present invention. The second bending mode resonant frequency can either be less than, or greater than the first bending mode (drive) frequency. If the second bending mode resonant frequency is higher than the drive frequency, the balance bar second bending mode vibrates in phase with the Coriolis induced vibration of the flow tube. This tends to reduce sensor phase shift and flowmeter sensitivity, but it can still be used to make the meter insensitive to changes in material density.

Flowmeter sensitivity is reduced when the second bending mode frequency is above the first bending mode drive frequency. The reason for this is that the flow tube's Coriolis vibration and the balance bar's second bending mode vibration are in phase. The velocity sensors sense relative velocity between the flow tube and balance bar which means that in phase motions tend to negate each other. This however, can still be a useful embodiment for making a meter with a flow sensitivity that is independent of changes in material density. If the balance bar second bending mode resonant frequency is above the drive frequency, an increasing material density lowers the drive frequency and increases the spacing between the two frequencies. This lowers the response of the balance bar to the Coriolis forces. But, because the balance bar's in phase response negates (is subtracted from) the Coriolis response of the flow tube, the lowered response of the balance bar results in an increased flow sensitivity of the meter. This increased flow sensitivity with increasing material density is once again capable of canceling the decrease in flow sensitivity caused by the change in vibration amplitude ratio between flow tube and balance bar. As in the other embodiment, in order for the balance bar change in flow sensitivity to precisely cancel the change in sensitivity caused by the drive mode vibration amplitude ratio, it is necessary to have the proper frequency separation between the two modes. How this proper separation is determined is discussed later.

In summary, the Coriolis flowmeter of the present invention includes a balance bar whose physical characteristics permit it to have a second bending mode resonant frequency that is near to its first bending mode (drive) frequency. This permits the balance bar to respond to the Coriolis deflections of the flow tube by producing Coriolis like deflections of its own. If the balance bar second bending mode resonant frequency is below the drive frequency, then its Coriolis force induced vibrations are out of phase with the Coriolis deflections of the flow tube. This increases the meter sensitivity and produces a flowmeter with a sensitivity to flow that is independent of changes in material density. If the balance bar second bending mode resonant frequency is above the drive frequency, then its Coriolis force induced vibrations are in phase with the Coriolis deflections of the flow tube. This decreases the sensitivity of the meter, but can also produce a flowmeter with a sensitivity to flow that is independent of material density.

DESCRIPTION OF THE DRAWINGS

The above and other advantages of the features of the invention may be better understood from a reading of the following detailed description thereof taking in conjunction with the drawings in which.

DETAILED DESCRIPTION

The present invention overcomes the problem of changes in flow sensitivity resulting from changes with material density in single tube flowmeters by the provision of a balance bar that actively responds to the Coriolis deflections of the flow tube. The balance bar response varies with changes in material density in such a way as to counter the change in sensitivity with density of prior single tube meters. In order to understand how this is done it is necessary to understand the nature of the Coriolis force on the flow tube, the distortion this produces in the flow tube, and how the distortion results in phase shift along the flow tube.

Figure 1:
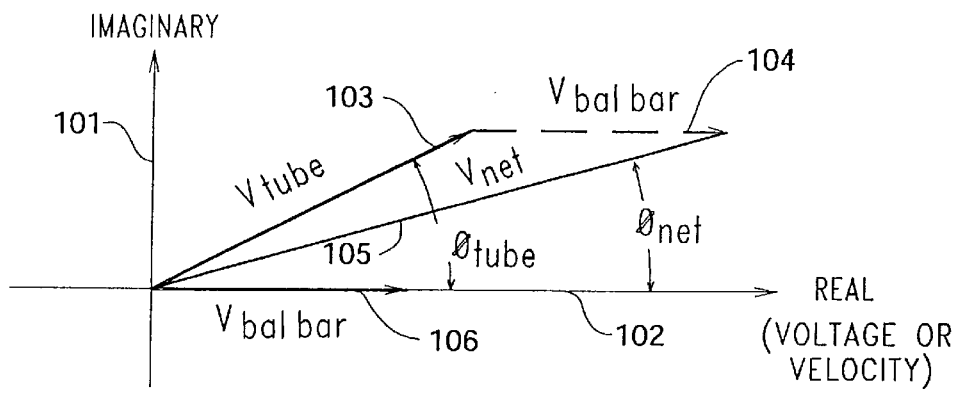
FIG. 1 is a vector diagram of a prior art single tube Coriolis flowmeter.

FIG. 1 is later described and is a vector diagram of the vibrational velocities of the flowmeter of FIG. 6.

Figure 2:
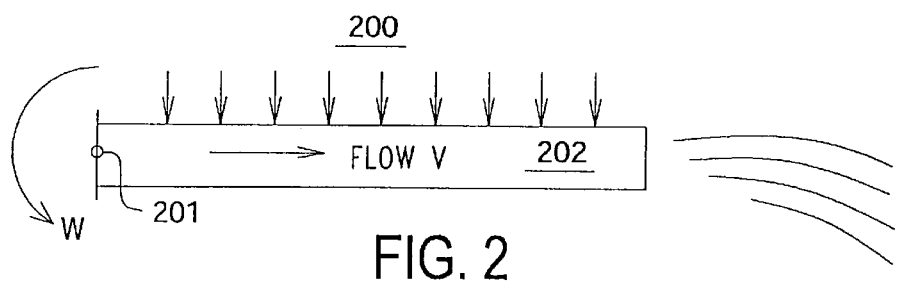
FIG. 2 discloses a rotating flow tube.

FIG. 2 shows a tube 202 through which material is flowing as it rotates counterclockwise about its end 201. The Coriolis force per unit length of tube 202 can be derived from the equation for Coriolis acceleration $A_c$ and Newton's law.

| Coriolis acceleration may be expressed as: | |
|---|---|
| $A_c = 2\,(\overline{\omega} \times \overline{v})$ | $\omega$ = angular velocity |
| | $v$ = material velocity |
| Coriolis Force $F_c$ may be expressed as: | |
| $F_c = MA_c = 2M\,(\overline{\omega} \times \overline{v})$ | M = material mass |
| | p = material density |
| since material $M = pA_t l$ | $A_1$ = tube flow area |
| | l = tube length |
| $F_c = 2pA_t l(\overline{\omega} \times \overline{v})$ | |
| $\dfrac{F_c}{l} = 2\rho A_t (\vec{\omega} \times \vec{v})$ | |
| $\rho A_t \vec{v} = \dot{M}$ | $\dot{M}$ = mass flow rate |
| $\dfrac{F_c}{l} = 2\dot{M} \times \vec{\omega}$ | |

The Coriolis force $F_c$ is uniform along the length of tube 202 because each part of tube 200 is rotating at the same rate and the mass flow rate is the same throughout the flow tube.

Figure 3:
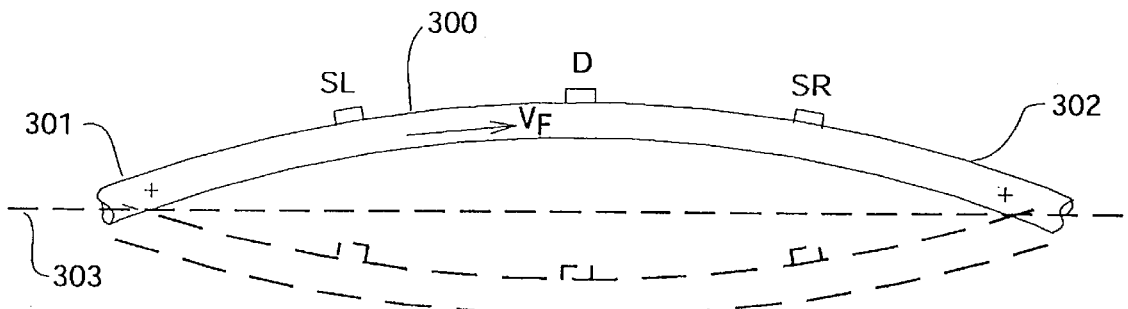
FIG. 3 discloses a vibrating flow tube.

FIG. 3 shows a straight flow tube 300 that is free to pivot about each end 301 and 302 but is fixed in translation at ends 301 and 302. Flow tube 300 is vibrated by driver D in the first bending mode at its resonant frequency, like a guitar string, while material flows through it. As the flow tube passes through its straight (zero displacement) position 303 downwards, it's left half rotates clockwise while its right half rotates counterclockwise. The rotations decrease as the tube's center is approached. The center does not rotate but merely translates. The spacial distribution of Coriolis forces on the flow tube 300 as it passes through zero displacement 303 is shown on FIG. 4. The Coriolis force is in opposite directions on the two halves because the tube rotation directions are opposite. The Coriolis force diminishes to zero at the center because the rotation of the tube diminishes to zero at the center.

Another major difference between vibrating tube 300 of FIG. 3 and the rotating tube 202 of FIG. 2 is that vibrating tube 300 does not rotate continuously, but stops and reverses direction. At the vibration direction reversal, the rotations are zero and the Coriolis force on the entire flow tube is zero. The result is that the magnitude of the Coriolis forces of FIG. 4 vary sinusoidally with time with the maximum occurring as the flow tube vibration goes through zero amplitude and maximum velocity as shown on FIG. 4. Zero Coriolis force occurs on the entire flow tube as the flow tube reaches its maximum vibration amplitude and zero velocity in the first bending (drive) mode. The frequency of the sinusoidal application of the Coriolis force to the flow tube is the same as the frequency at which it is being vibrated; namely, the flow tube's first bending (drive) mode vibration frequency.

Figure 4:
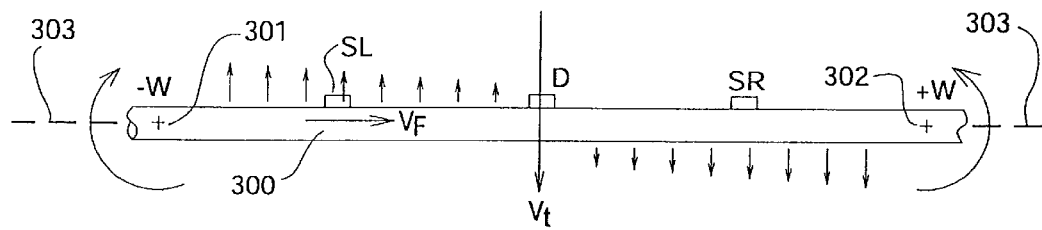
FIG. 4 discloses the Coriolis forces applied to the flow tube of FIG. 3.
Figure 5:
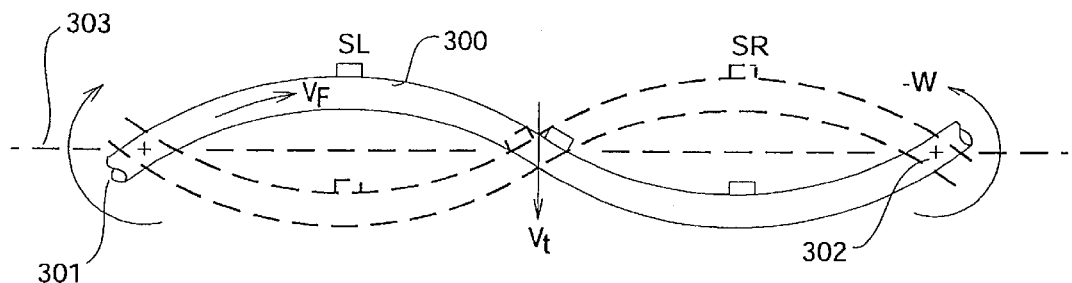
FIG. 5 discloses the Coriolis response of the flow tube of FIG. 3.

Flow tube 300 bends in response to the periodic Coriolis force as shown in FIG. 5. The solid line shows the shape (greatly exaggerated) the tube takes in response to the Coriolis force as the tube passes downward through zero displacement in the drive mode. The dashed line shows the shape the tube takes as it moves upward through zero displacement in the drive mode. Note that the only point on the flow tube that is in fact passing through zero at this instant is the mid point of the tube. The shape of FIG. 5 is similar to the second bending mode shape. However, this is just a coincidence. The frequency of the second bending mode of the flow tube is much higher than the frequency at which the Coriolis force of FIG. 4 is applied (the frequency of the first bending mode). Since the flow tube is being excited by Coriolis forces at well below its second bending resonant frequency, this Coriolis caused deformation of FIG. 5 and the Coriolis force of FIG. 4 occur in phase with each other. Flow tube 300 therefore assumes the shape of FIG. 5 as it crosses zero displacement axis 303 in its driven vibration (first bending) mode. Material flow superimposes the Coriolis induced vibration of FIG. 5 on the driven vibration of FIG. 3. This is shown on FIG. 6. Both vibrations occur at the first bending mode drive frequency; but they are phase shifted from each other by ninety degrees. The Coriolis induced displacement maximum (solid lines) occurs when the first bending mode is at zero displacement along axis 303. The Coriolis displacement becomes zero when the first bending mode is at maximum displacement (dashed lines). FIG. 6 is analogous to FIG. 4 in that it represents the state of the flow tube in so far as Coriolis deflections are concerned at the time flow tube 300 crosses zero axis 303. At this time, and at this time only, the Coriolis forces and Coriolis induced deflections are at a maximum amplitude. As already explained for FIG. 4, the Coriolis forces diminish and ultimately become zero when the deflection of flow tube 300 reaches its maximum in either an upwards or downward direction. At this time, the velocity of the flow tube is zero and so are the applied Coriolis forces and resultant Coriolis deflection. Thus, the sinusoidal Coriolis response shown in FIG. 5 varies sinusoidally in amplitude at the drive frequency as flow tube 300 is vibrated sinusoidally in its first bending mode between its maximum positive and negative deflection by the drive signal. The amplitude of the Coriolis displacement shown on FIGS. 5 and 6 is greatly exaggerated for clarity. The amplitude is in reality much less than the amplitude of the first bending mode of flow tube 300 because the first bending mode is driven at the resonant frequency of the flow tube and the Coriolis mode is not. Thus, the Coriolis deformations shown in all the figures are greatly exaggerated.

The phase delay associated with material flow in prior art meters is the result of the superposition of the first bending (drive) mode and the Coriolis deflection of the flow tube. In FIG. 5 it can be seen that right velocity sensor SR crosses zero displacement before left velocity sensor SL. It can be said that the left sensor and its output voltage lag the phase of the right sensor and its output voltage. Conversely, it can also be said that the right sensor SR leads the phase of the left sensor SL. The phase difference (or time delay) is proportional to the amplitude of the Coriolis induced displacement which is, in turn, proportional to the mass flow rate.

The present invention involves shifting the frequency order of the various mode shapes of the balance bar. The vibration modes are defined according to their shapes, not their frequency order. The first bending mode will hereafter be referred to as that shown in FIG. 3. The second bending mode will be of the shape shown in FIG. 5. A useful rule is that the mode number is equal to the number of nodes minus one. The first mode has two nodes (at the ends). The second has three (at the ends and in the center). The third bending mode has four nodes, etc.

In conventional single tube Coriolis flowmeters, the balance bar only vibrates in the first bending mode and lacks any response to Coriolis forces on the flow tube. FIG. 6 shows a prior art single tube Coriolis flowmeter 600 having a flow tube 601 and a balance bar 602 connected by brace bars 603 and 604 at the ends of balance bar 602. The solid lines of FIG. 6 shows flow tube 601 and balance bar 602 as they cross zero displacement axis 303 in the first bending (drive) mode with material flow. No Coriolis deflections appear on balance bar 602 on FIG. 6. The dashed lines show the flow tube and balance bar at the outward extent of their vibration in the first bending (drive) mode.

Figure 6:
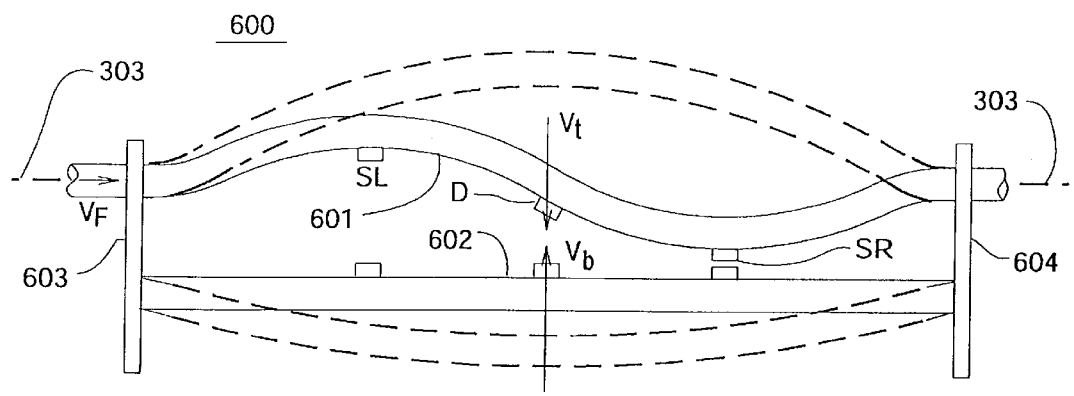
FIG. 6 discloses a prior art straight tube Coriolis flowmeter.

FIG. 1 is a vector diagram disclosing the vibrational velocities generated by the conventional single straight tube Coriolis flowmeter as represented in FIG. 6. The response of the flow tube at the right velocity sensor SR is vector 103 which has a leading phase, $\phi$ tube, represented by the angle between vector 103 and the real axis 102. The length of vector 103 represents its peak velocity (or vibration amplitude since they are proportional). Its projection on the X-axis represents its instantaneous velocity. Vector 106 of the balance bar is not shifted in phase from axis 102 since the balance bar is not affected by the generated Coriolis forces on the flow tube. The balance bar vector 106 is shown along the real axis 102 and is entitled $V_{Bal\ bar}$. The vector sum of the flow tube and balance bar vectors is vector 105 which has a phase angle $\phi_{net}$ representing the combined vector amplitudes and phases of the flow tube and balance bar. Note that the net phase angle out of the right sensor SR is less than the phase angle for the tube alone. The reduction in phase angle (and meter sensitivity) is due to the lack of phase shift of the balance bar in conventional single tube meters.

Figure 27:
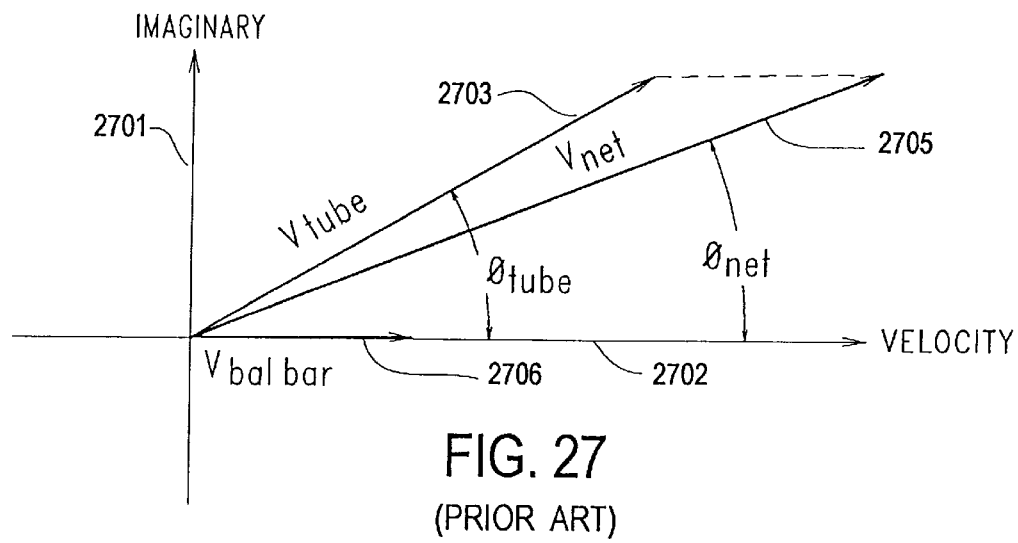
FIGS. 27 and 28 are vector diagrams illustrating the operation of a prior art flowmeter for different material densities.
Figure 28:
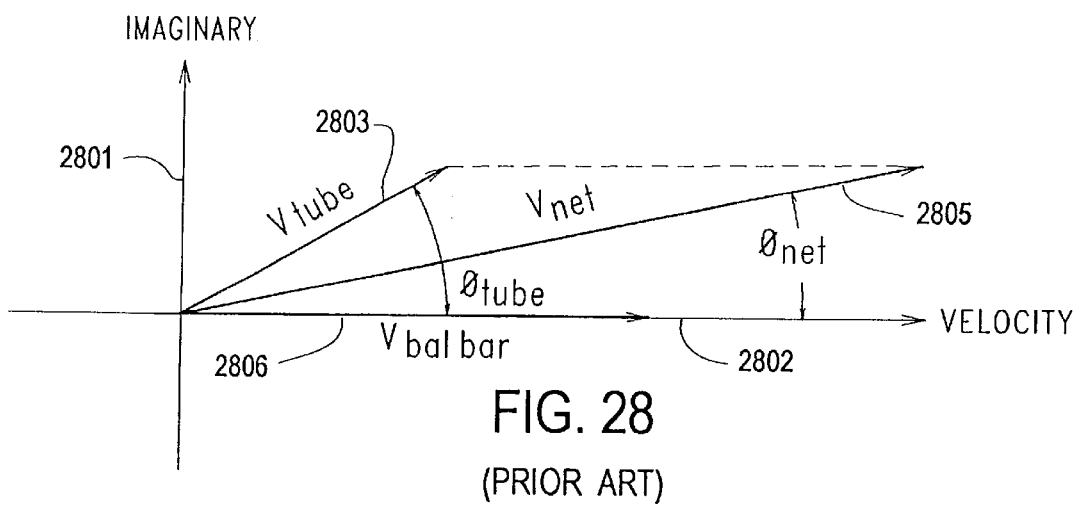

FIGS. 27 and 28 are vector diagrams for a prior art meter having different amplitude ratios due to a change in material density. A comparison between the two diagrams would normally be meaningless because the density difference results in a shift in drive frequency as well as flow tube phase. Therefore, the phase angles have all been "normalized" for frequency. What this means is that the phases have been divided by the tube frequency. The normalized phase angles are in reality time delay. Since Coriolis force and thus phase angle is proportional to tube frequency, the normalized phase angles of the flow tubes are independent of tube frequency. The normalized phase angle of the flow tube of FIG. 27 is therefore equal to the normalized phase angle of FIG. 28 for the same flow rate and comparisons become meaningful.

FIG. 27 is a vector diagram for a flow meter having a relatively large flow tube vector 2703 and a relatively small balance bar vector 2706 as results from a material having a low material density. The flow tube vector has a normalized phase of $\phi_{tube}$ with respect to the X-axis 2702 while the balance bar vector 2706 lies along the X-axis 2702 and has a phase angle of zero. The vector sum of vectors 2703 and 2706 is vector 2705 having a velocity of $V_{net}$ and having a normalized phase angle $\phi_{net}$ with respect to the X-axis 2702. Axis 2701 is the imaginary axis. The flow tube/balance bar amplitude ratio is the magnitude of vector 2703 over 2706.

FIG. 28 is a vector diagram for the same flow meter having a relatively small flow tube amplitude vector 2803 and a relatively large balance bar vector 2806 resulting from a higher material density. The flow tube vector $V_{tube}$ has a normalized phase of $\phi_{tube}$ with respect to the X-axis 2802. The balance bar vector $V_{bal\ bar}$ has zero phase and is coincident with the X-axis 2802. The vector sum of these two vectors is the vector $V_{net}$ 2805 having a normalized angle of $\phi_{net}$ with respect to the X-axis 2802. The imaginary axis is 2801.

In comparing the vector diagrams of FIG. 27 with that of FIG. 28 it can be seen that the normalized phase of the resultant vector 2705 for the lighter density material flow is larger than the normalized phase of the resultant vector 2805 of FIG. 28 for a material flow of greater density. Recalling that the normalized phase of the resultant vector on each of FIGS. 27 and 28 is the time delay of the velocity sensor of the associated flowmeter, it can be observed that a flowmeter operating with a material flow of lower density has greater sensitivity than does the same flowmeter operating with a material flow of a higher density. From this it can also be seen that a single tube flowmeter inherently has a greater flow sensitivity due to amplitude ratio change for lighter materials (FIG. 27) than for heavier materials (FIG. 28).

Figure 7:
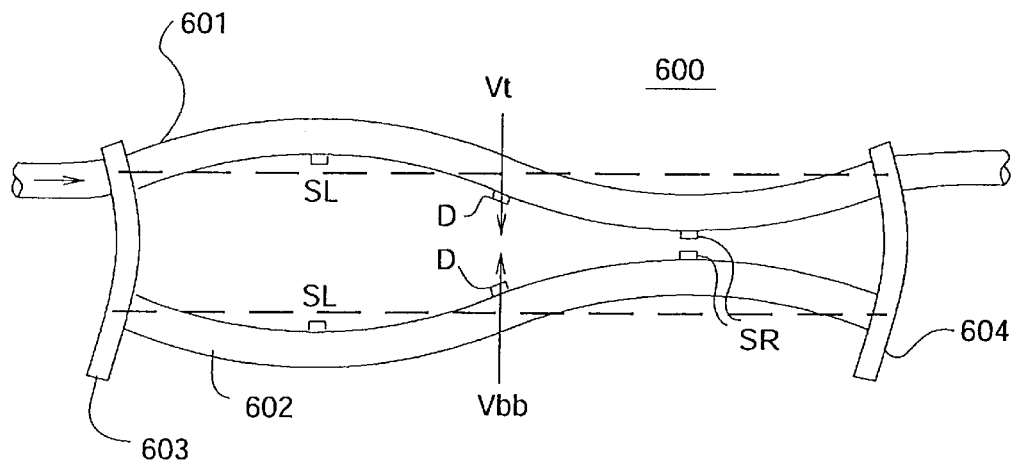
FIGS. 7 and 8 disclose the Coriolis vibrational characteristics of a single tube Coriolis flowmeter of the present invention.

The embodiment of the present invention shown in FIG. 7 provides a balance bar whose second bending mode resonant frequency is slightly below the first bending mode drive frequency. The Coriolis induced deflection of flow tube 601 excites the second bending mode in the balance bar 602 by way of brace bars 603 and 604. The vibration amplitude of the balance bar 602 vibration in its second bending mode is proportional to the Coriolis deflection amplitude of flow tube 601 and thus is proportional to the material flow rate. The vibration amplitude of balance bar 602 in its second bending mode on FIG. 7 is also a function of the separation between the first bending mode (drive) frequency and the balance bar second bending mode resonant frequency. The closer the second bending mode frequency of the balance bar is to the first bending mode (drive) frequency, the greater will be the vibrational amplitude of the balance bar in its second bending mode. This relationship is shown in detail on FIG. 9 which is a graph of the vibrational amplitude rartio of the balance bar in its second bending mode divided by the Coriolis defection of the flow tube versus the ratio between the first bending mode (drive) frequency and the balance bar 602 second bending mode resonant frequency. The x axis 902 indicates the ratio between the first bending mode (drive) frequency and the second bending mode resonant frequency of the balance bar. The y axis 901 represents the amplification factor of the Coriolis response of balance bar 602. As can be seen, the Coriolis response induced in balance bar 602 is at a maximum when the ratio between the drive frequency and the second bending mode resonant frequency of the balance bar is 1.0. The Coriolis induced response 904 of the balance bar decreases towards zero from its maximum as the ratio of the two frequencies on FIG. 9 become greater than 1.0. The Coriolis response of the balance bar also decreases from its maximum as the ratio of these two frequencies becomes less than one.

Figure 9:
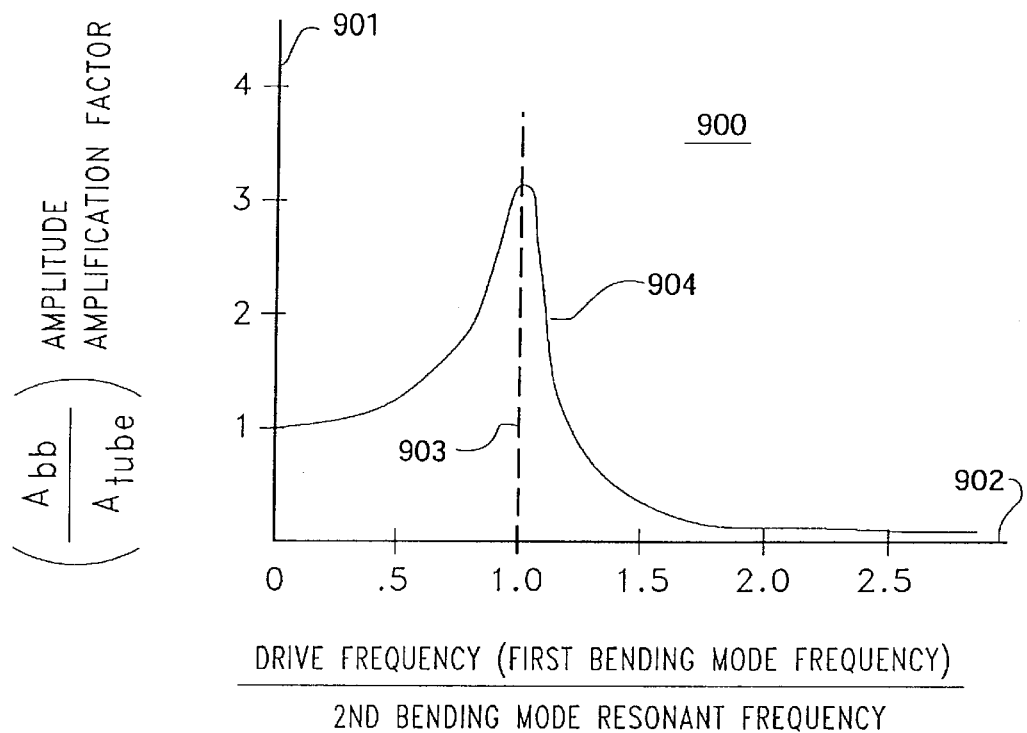
FIGS. 9 and 10 disclose frequency response curves of the flowmeter of the present invention.
Figure 10:
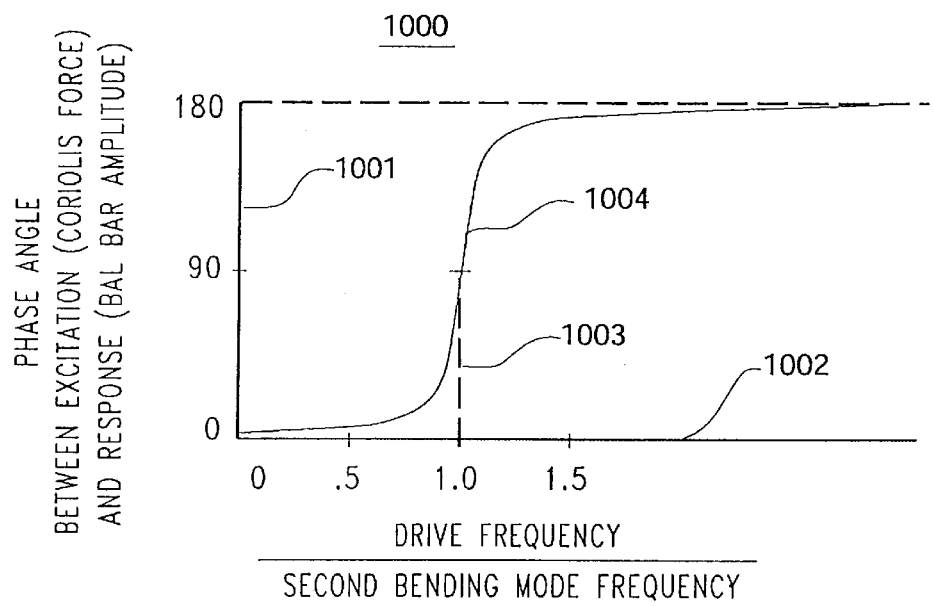

It can also be seen from FIG. 9 that the slope of the curve gets steeper as the frequency ratio approaches one from either direction. Thus a small change in drive frequency produces a bigger change in the second bending mode amplitude of the balance bar if the frequency ratio is near one than if it is further away. It is this change in slope of this amplification curve that is used in the present invention to determine what the frequency separation should be in order to precisely cancel the change in sensitivity due to vibration amplitude ratio change and other causes.

This relationship is used in accordance with the present invention to achieve a flowmeter having a flat calibration factor and constant flow sensitivity for material flows of different densities.

FIG. 7 discloses the embodiment in which the balance bar second bending mode resonant frequency is below the drive frequency but is sufficiently close to the drive frequency so that Coriolis deflections in the flow tube excite the second bending mode Coriolis like vibrations in the balance bar. In this embodiment the balance bar second bending mode Coriolis-like vibrations and the flow tube Coriolis deflections are out of phase with each other. As a result the phase of the flow tube velocity at the right sensor has the same sign as the phase of the balance bar velocity at the right sensor. As shown on FIG. 7, sensor SR on both the flow tube and the balance bar have already crossed the zero displacement position at the time the driver is crossing zero. This is a leading phase and is represented by a positive phase angle. The magnitude of the flow tube phase angle is proportional to the amplitude of the flow tube's Coriolis deflection. The magnitude of the balance bar phase angle is proportional to the balance bar's Coriolis like amplitude in its second bending mode. It can be seen in FIG. 7 that the balance bar behaves like another flow tube and enhances the flow sensitivity of the meter.

Figure 11:
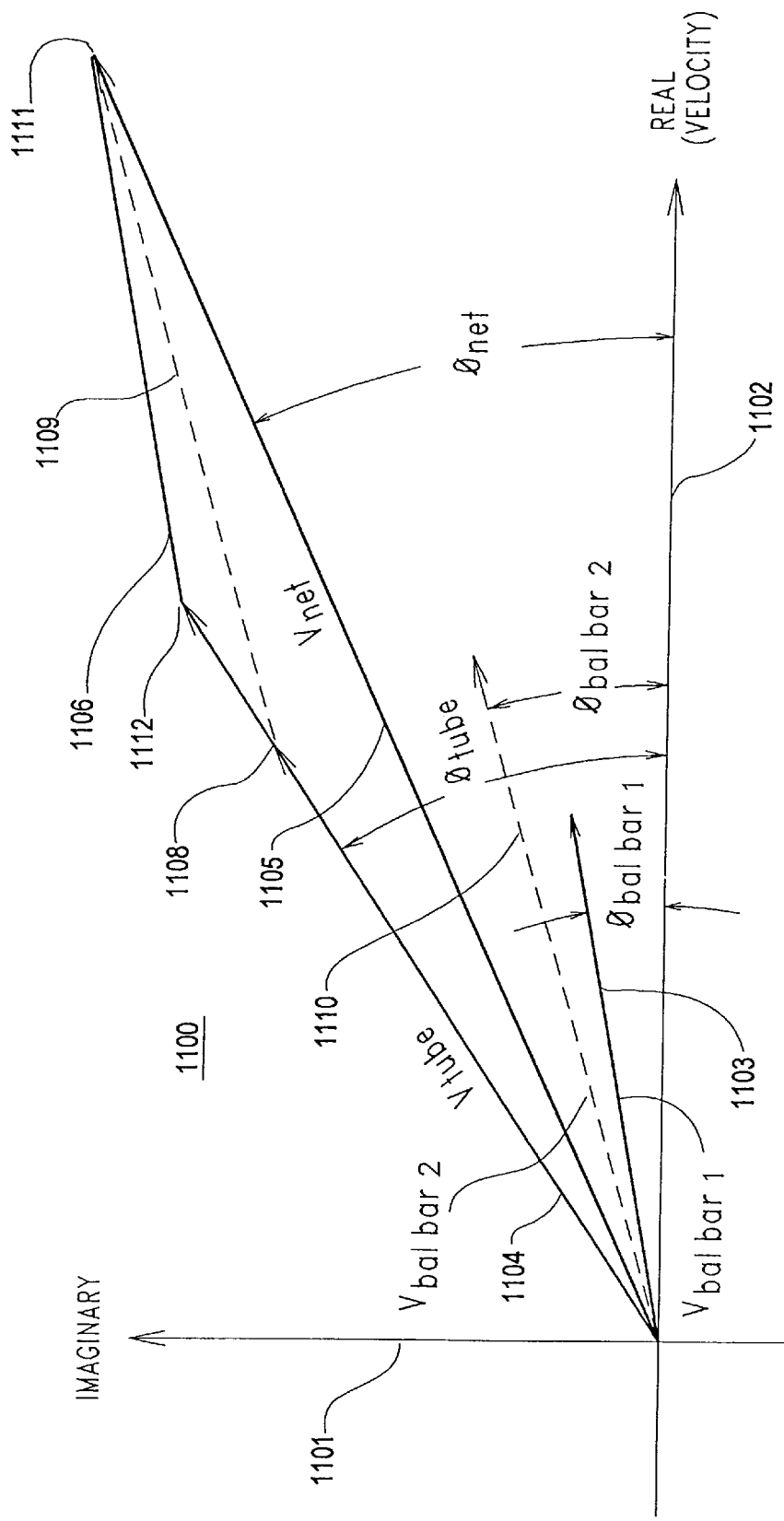
FIGS. 11 and 12 are vector diagrams of the single tube Coriolis flowmeter of the present invention.

FIG. 11 is the vector diagram for the embodiment of FIG. 7. In this embodiment, the balance bar second bending mode resonant frequency is below the drive frequency. Velocity in the drive mode is shown on the X-axis while the Y axis is the imaginary axis. (The X axis could also be amplitude since velocity and amplitude are proportional in vibrating systems.) The flow tube velocity vector $V_{tube}$ 1104 has a length proportional to its peak velocity (or amplitude) in the drive mode. It is about twice as long as the balance bar velocity vector 1103, $V_{bal\ bar}$, because the flow tube has higher vibration amplitude than the balance bar. The instantaneous velocities of the flow tube and balance bar can be determined by the projected lengths of their vectors on the X-axis. The sum of the flow tube and balance bar velocity vectors is $V_{net}$. The length of the $V_{net}$ vector 1105 represents the peak relative velocity between the two components (magnet and coil) of the velocity sensor SR. The instantaneous relative velocity is the projection of the $V_{net}$ vector 1105 on the X-axis.

The Coriolis deflection amplitude (or velocity) of the flow tube right sensor SR, is about three times as large as the balance bar second bending mode amplitude (or velocity) at the right sensor SR. This is evident by the greater normalized phase angle for the flow tube, $\phi_{tube}$, than for the balance bar, $\phi_{bal\ bar\ 1}$. The angle between the $V_{net}$ vector 1105 and the X-axis is the net normalized phase, $\phi_{net}$, by which the voltage produced by the right velocity sensor, SR, leads the zero crossing of the driver. The left velocity sensor, SL, (not shown on FIG. 11) lags the driver by the same normalized phase angle. The normalized phase difference between the voltage signals of the two velocity sensors is the time delay and is proportional to the mass flow rate.

The dashed vectors of FIG. 11 show the result of increasing the material density in the flowmeter. The phase angles are normalized (divided by frequency) to enable the vectors for both densities to be displayed on the same graph. On FIG. 11 the flow tube drive mode amplitude (and velocity) vector 1104 has decreased from location 1112 to 1108 with the increased material density while its normalized phase $\phi_{tube}$ has remained unchanged. The flow tube behavior with material density change is the same as in prior art meters as can be seen in FIGS. 27 and 28 where FIG. 27 represents a less dense material flow than FIG. 28. The balance bar amplitude (and velocity) vector 1103 has increased in magnitude to that of the longer vector 1110 as in prior art meters. However, unlike prior art meters of FIGS. 27 and 28, the balance bar's normalized phase angle has increased from $\phi_{bal\ bar\ 1}$ to $\phi_{bal\ bar\ 2}$ with the increase in material density. The normalized phase angle of the balance bar vector 1110 increased because the increase in material density lowered the drive mode frequency and moved it closer to the balance bar second bending mode resonant frequency. This resulted in a larger Coriolis like amplitude of vibration in the second bending mode and thus a larger normalized phase angle $\phi_{bal\ bar\ 2}$.

The key to the present invention is that the change in normalized phase angle of the balance bar vector 1110 is the correct amount to leave the $V_{net}$ vector 1105 unchanged in both length at location 1111 and normalized phase angle $\phi_{net}$ from the $V_{net}$ vector 1105 with a lower density material. That the $V_{net}$ vector 1105 is unchanged in length is a result of the electronic amplitude control of the meter which is found in both the present invention and in prior art meters. That the $V_{net}$ vector 1105 is unchanged in the normalized phase angle $\phi_{net}$, is the result of the change in the balance bar second bending mode Coriolis like vibration amplitude with material density. This change in Coriolis like vibration amplitude of the balance bar second bending mode is sized to the correct magnitude by designing the balance bar so that its second bending mode Coriolis like resonant frequency is the correct distance away from the drive mode frequency. At this correct frequency separation, the slope of the amplification curve is such that the change in material density alters the frequency separation and changes the balance bar second bending mode Coriolis like vibration amplitude the amount needed to leave the $V_{net}$ vector 1105 unchanged and the sensitivity of the meter unchanged.

The change in meter flow sensitivity with density due to a shift in drive mode vibration amplitude ratio is unavoidable. It is possible, however, to adjust the amount of flow sensitivity shift. It is easy to see how this can be done by imagining a flowmeter with a balance bar that is infinitely heavy (and infinitely stiff so as to maintain the proper resonant frequency). This balance bar would have a drive mode vibration amplitude of zero to balance the flow tube. Changing the fluid density in the imaginary meter would have no effect on the flow calibration factor because the balance bar vibration amplitude would remain zero and the flow tube amplitude and phase would remain unchanged.

With a more realistic meter having a balance bar that is merely much heavier than the flow tube with fluid, the balance bar amplitude and velocity vector remain very small. Changing fluid density significantly changes the length of the balance bar velocity vector but, compared to the flow tube velocity vector, the balance bar velocity vector remains small. The length of the flow tube velocity vector changes the same amount as the balance bar velocity vector but in the opposite direction. This length change is only a small percentage of the longer flow tube velocity vector. Because the balance bar velocity vector remains very small compared to the flow tube velocity vector, the change in length of the balance bar vector with fluid density has only small effect on the phase angle of the net velocity vector and the meter flow sensitivity.

The change in meter flow sensitivity with change in fluid density is greatest when the drive mode vibration amplitude of the flow tube is approximately equal to the drive mode vibration amplitude of the balance bar. This is the case illustrated by FIG. 27 and FIG. 28. In FIG. 27 the fluid has a low density and the flow tube has a greater vibration amplitude than the balance bar. In FIG. 28 the fluid has a high density and the balance bar has a higher vibration amplitude than the flow tube. It can readily be seen from these figures that the change in the phase of the net velocity vector is large because both the flow tube velocity vector and the balance bar velocity vector undergo significant changes in length with fluid density change.

In summary, the change in flow sensitivity due to a change in vibration amplitude ratio is greatest when the vibration amplitude of the balance bar is near equal to the vibration amplitude of the flow tube. The change in sensitivity is least when the balance bar amplitude is very small compared to the amplitude of the flow tube. In prior art meters the balance bar drive mode vibration amplitude has always been made very small by making it as heavy as economically possible. This minimizes the effect of the changing vibration amplitude ratio with fluid density. As described elsewhere herein, however, there are other causes besides drive mode vibration amplitude ratio change for the flow sensitivity of the meter to change with fluid density. Some of the other causes change the flow sensitivity in the opposite direction as the drive mode vibration amplitude ratio changes. It thus is useful to recognize the relationship between balance bar mass and flow sensitivity shift. The balance bar mass can then be chosen so that the shift in sensitivity due to drive mode vibration amplitude ratio change is opposite to and cancels the shift in sensitivity due to other causes. One such other cause is the change in sensitivity due to the change in the ratio of the Coriolis deflection amplitude to the balance bar second bending mode amplitude with a change in density.

Figure 30:
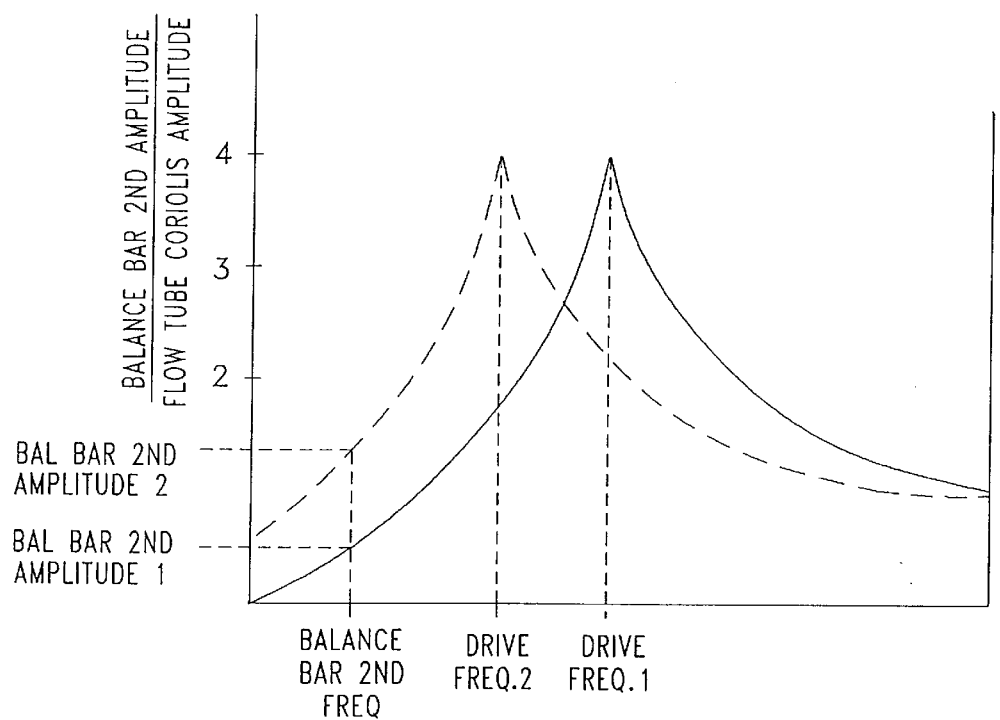

FIG. 30 illustrates how the balance bar second bending amplitude changes as material density (and thus drive frequency) changes. In FIG. 30 the X-axis is frequency and on it are vertical lines for the drive frequency with a low density material (Drive Freq. 1), a high density material (Drive Freq. 2), and the balance bar second bending mode resonant frequency (Bal Bar $2^{nd}$ Freq.). The Y-axis is the ratio of the balance bar second bending amplitude divided by the flow tube Coriolis amplitude. The solid curve is the ratio for the balance bar second bending amplitude with the light material having drive frequency 1. Where the vertical line of the balance bar second resonant frequency intersects this curve determines the balance bar second/flow tube Coriolis amplitude ratio. It thus can be seen that Drive Freq. 1 results in Bal Bar $2^{nd}$ Amplitude 1. Likewise, the dashed curve is the amplitude ratio for the balance bar second bending with the more dense material having drive frequency 2. Drive Freq. 2 results in Bal Bar $2^{nd}$ Amplitude 2. It can be seen on FIG. 30 that the difference in amplitude ratio for a given shift in drive frequency is a function of the location of the balance bar second resonant frequency with respect to the drive frequencies. If the separation is large, the change in the balance bar second amplitude ratio with material density is small. If the frequency separation is small (if the Bal Bar $2^{nd}$ Freq. Line were moved to the right), then the change in the balance bar second amplitude ratio is large.

It can be seen in FIG. 7 that the balance bar deflection in its second bending mode looks like Coriolis deflection in a second flow tube. Thus an increase in balance bar second bending amplitude results in an increase in the phase of the balance bar velocity vector shown in FIG. 11. FIG. 11 also shows that if the increase in phase with density of the balance bar velocity vector is of the correct amount, then the net velocity vector can remain unchanged in normalized phase and amplitude. This means that the flow sensitivity of the meter can remain unchanged with changing density. FIG. 30 shows how the balance bar second bending amplitude change with density can be adjusted by the frequency separation between the balance bar second resonant frequency and the drive frequency. Smaller frequency separation results in greater sensitivity increase with density. Thus it is possible, by proper placement of the balance bar second bending resonant frequency, to design a flowmeter having a balance bar whose velocity vector phase changes the proper amount to leave the net velocity vector unchanged with material density change. Such a design produces a single tube Coriolis flow meter that has a flow sensitivity that is not effected by material density.

Figure 8:
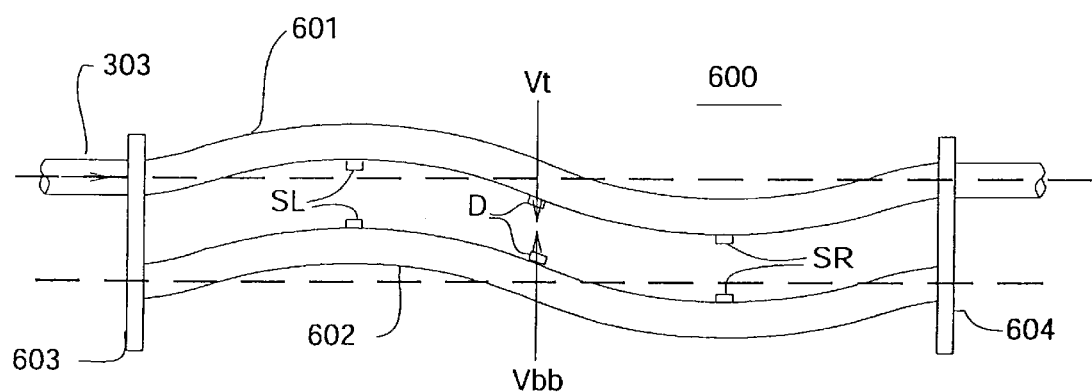

FIG. 8 shows an embodiment where the balance bar second bending mode resonant frequency is above the drive frequency and sufficiently close to the drive frequency that the Coriolis deflections in the flow tube excite Coriolis like second bending mode vibrations in the balance bar. In this embodiment the balance bar second bending mode Coriolis like vibrations and the flow tube Coriolis deflections are in phase with each other. This means that the phase of the flow tube velocity at the right sensor SR has the opposite sign as the phase of the balance bar at the right pickoff. As shown on FIG. 8, sensor SR on the flow tube has already crossed the zero displacement position while sensor SR on the balance bar has not yet crossed the zero displacement position. The flow tube thus has a leading phase and the balance bar has a lagging phase. These are represented by positive and negative normalized phase angles respectively on FIG. 12. The magnitude of the flow tube normalized phase angle $\phi_{tube}$ is proportional to the amplitude of the flow tube's Coriolis deflection while the magnitude of the balance bar normalized phase angle $\phi_{bal\ bar}$ is proportional to the balance bar's Coriolis like amplitude in its second bending mode. It can be seen in FIG. 8 that the balance bar behaves like another flow tube only with negative Coriolis deflections.

Figure 12:
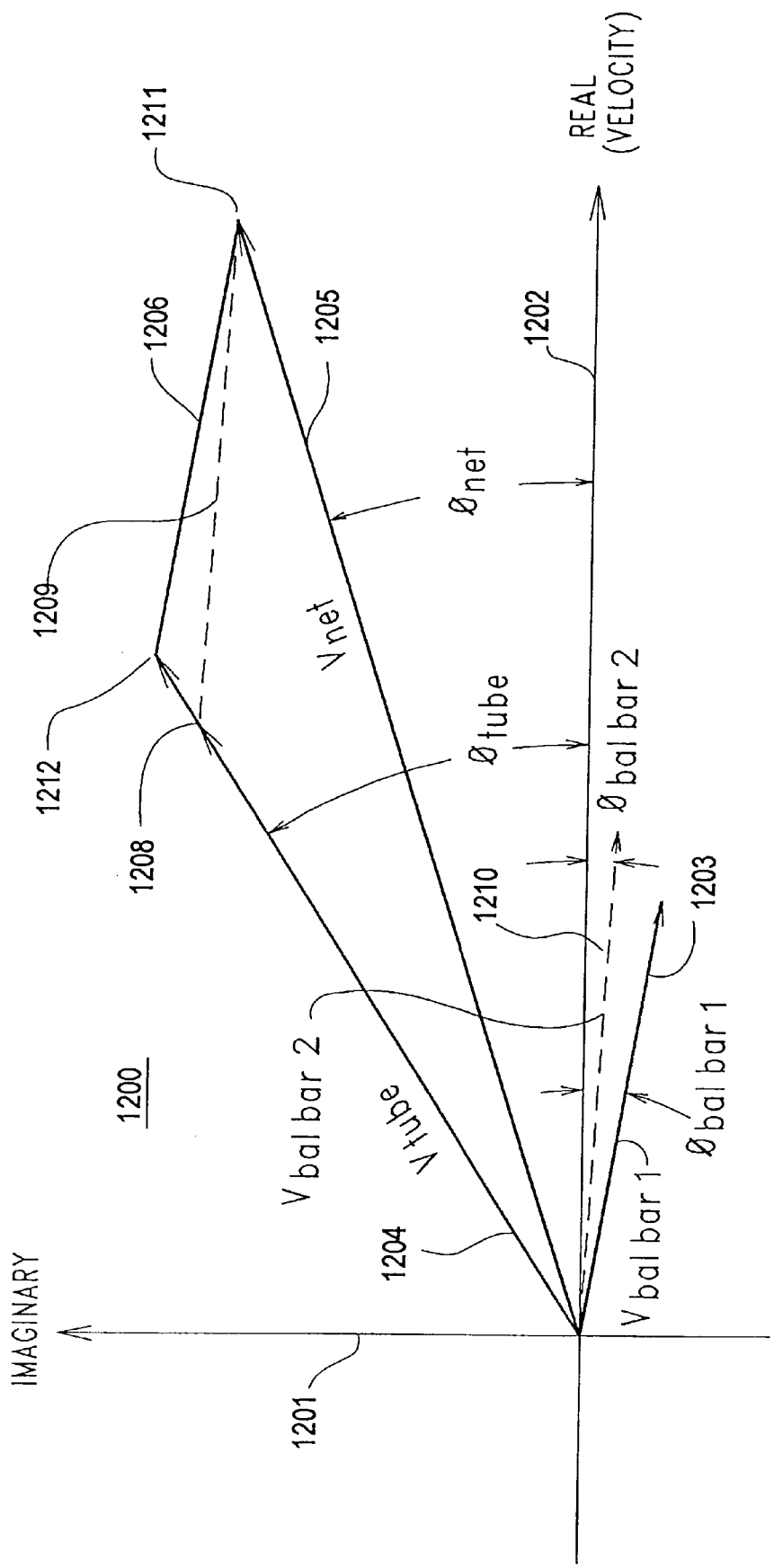

FIG. 12 is the vector diagram for the embodiment depicted in FIG. 8. In this embodiment, the balance bar second bending mode frequency is above the drive frequency. Velocity in the drive mode is shown on the X-axis while the Y-axis is the imaginary axis. The flow tube velocity vector 1204 $V_{tube}$ has a length at location 1212 proportional to its peak velocity (or amplitude) in the drive mode. It is about twice as long as the balance bar velocity vector 1203, $V_{bal\ bar}$, because the flow tube has higher vibration amplitude in the drive mode than the balance bar. The instantaneous velocities of the flow tube and balance bar can be determined by the projected lengths of their vectors on the X-axis. The sum of the flow tube and balance bar velocity vectors is 1205 $V_{net}$. The length of the $V_{net}$ vector 1205 represents the peak relative velocity between the two components of the velocity sensor SR. The instantaneous relative velocity is the projection of the $V_{net}$ vector on the X-axis.

The Coriolis deflection amplitude (or velocity) of the flow tube right sensor SR 1204 is about three times as large as the balance bar Coriolis like second bending amplitude 1203 (or velocity) at the right sensor, SR. This is evident by the greater normalized phase angle $\phi_{tube}$ for the flow tube than the normalized phase angle $\phi_{bal\ bar}{}^1$ for the balance bar. Note that the normalized phase angle $\phi_{bal\ bar}{}^1$ of the balance bar vector is negative. This is the result of having the second bending resonant frequency above the drive frequency. The normalized phase angle $\phi_{net}$ between the $V_{net}$ vector 1205 and the X-axis is the net time delay by which the voltage produced by the right velocity sensor SR leads the zero crossing of the driver. The left velocity sensor, SL, (not shown on FIG. 11) lags the driver by the same time delay. The time difference between the voltage signals of the two velocity sensors is proportional to the mass flow rate.

The dashed vectors in FIG. 12 show the result of increasing the material density in the flowmeter. Once again the phase angles are normalized (divided by frequency) to enable the vectors for both densities to be displayed on the same graph. It can be seen in FIG. 12 that the flow tube drive mode amplitude (and velocity) vector 1204 has decreased in magnitude from that of location 1212 to that of location 1208 with the increased material density while its normalized phase $\phi_{tube}$ has remained unchanged. The balance bar amplitude (and velocity) vector 1203 in the drive mode has increased to the larger vector 1210. However, unlike prior art meters, and unlike the embodiment of FIG. 7, the balance bar's normalized phase angle has decreased (moved closer to the X-axis) from $\phi_{bal\ bar\ 1}$ to $\phi_{bal\ bar\ 2}$ with the increase in material density. The normalized phase angle of the balance bar decreased because the increase in material density lowered the drive mode frequency and moved it further away from the balance bar second bending mode resonant frequency. This resulted in a smaller Coriolis like vibration amplitude in the second bending mode and thus a smaller normalized phase angle. Because the phase angle is negative, however, the decrease results in a gain in the meter sensitivity.

The key to the embodiment with the balance bar second bending resonant frequency above the drive frequency, as in the embodiment of FIGS. 7 and 12, is that the change in normalized phase angle of the balance bar with density change is the amount needed to leave the $V_{net}$ vector 1205 unchanged in both length and normalized phase angle. The $V_{net}$ vector 1205 is unchanged in length as a result of the electronic amplitude control of the meter which is found in both the present invention and in prior art meters. The $V_{net}$ vector 1205 is unchanged in its normalized phase angle as a result of the change in the balance bar second bending amplitude with material density. This change in amplitude of the balance bar second bending mode is sized to the magnitude needed by designing the balance bar so that its second bending mode resonant frequency is the correct distance away from the drive mode frequency. At the correct frequency separation, the slope of the amplification curve is such that the change in material density changes the frequency separation and changes the balance bar second bending mode amplitude the amount needed to leave the $V_{net}$ vector 1205 unchanged and the sensitivity of the meter unchanged.

Figure 29:
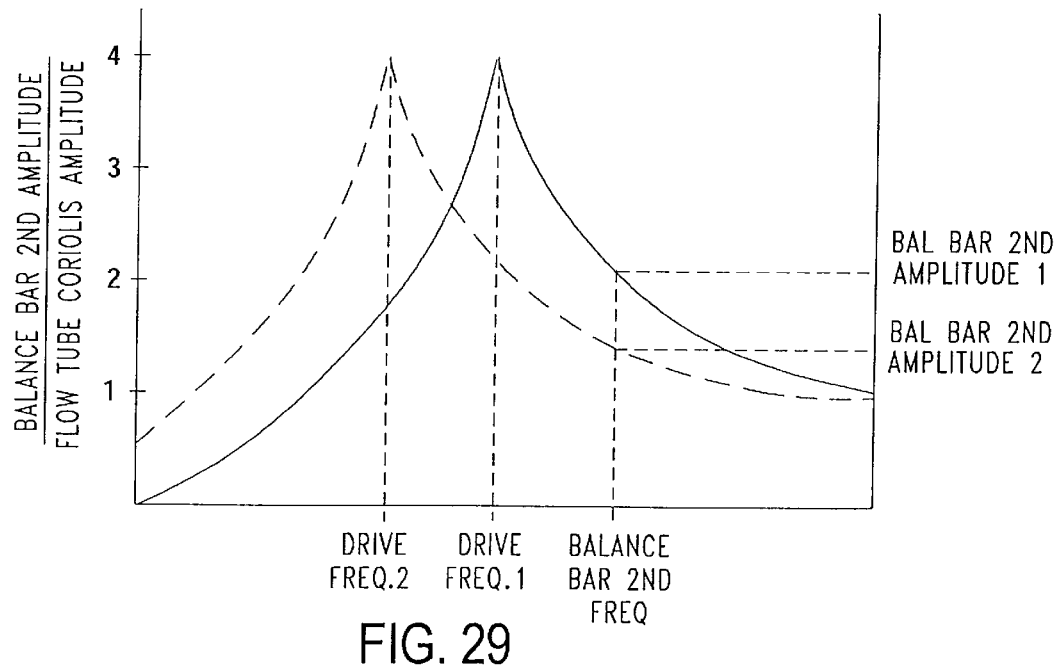
FIGS. 29 and 30 illustrate the relationship between the balance bar second vibrational amplitude and the flow tube Coriolis amplitude with respect to different drive frequencies.

FIG. 29 illustrates how the balance bar second bending amplitude changes as the material density (and thus drive frequency) changes. FIG. 29 is the same as FIG. 30 only the balance bar second bending resonant frequency is above the drive frequency rather than below it. As in FIG. 30, the solid curve is the amplification ratio for the balance bar with the light material having drive frequency 1. Where the vertical line of the balance bar second resonant frequency intersects this curve determines the balance bar second/flow tube Coriolis amplitude ratio. It thus can be seen that Drive Freq. 1 results in Bal Bar $2^{nd}$ Amplitude 1. Likewise, the dashed curve is the amplitude ratio for the balance bar second bending with the more dense material having drive frequency 2. Drive Freq. 2 results in Bal Bar $2^{nd}$ Amplitude 2. In FIG. 29 it can be seen that as the material density increases and the drive frequency decreases, the separation between the drive frequency and the balance bar second bending resonant frequency increases. This results in a decrease in the balance bar second bending amplitude. Thus in FIG. 29, balance bar amplitude 2 (for higher density material) is lower than balance bar amplitude 1. The decrease in amplitude results in a decrease in the magnitude of the phase angle of the balance bar velocity vector. However, because the phase angle is negative, the decrease in magnitude is an increase in phase of the balance bar velocity vector. This increase of balance bar phase (decrease of negative phase) with material density enables the net vector to remain unchanged in length and normalized phase. In FIG. 29, as in FIG. 30, the difference in amplitude ratio for a given shift in drive frequency is a function of the location of the balance bar second resonant frequency with respect to the drive frequencies. If the separation is large, the change in the balance bar second amplitude ratio with material density is small. If the frequency separation is small (if the Bal Bar $2^{nd}$ Freq. Line were moved to the left), then the change in the balance bar second amplitude ratio is large. Thus, by designing the correct frequency separation, the change in balance bar velocity vector phase can be set to produce a constant net vector.

In summary, it can be seen in FIG. 8 that the balance bar deflection in its second bending mode looks like negative Coriolis deflection in a second flow tube. Thus a decrease in balance bar second bending amplitude results in a decrease in the negative phase of the balance bar velocity vector shown in FIG. 12. FIG. 12 also shows that if the decrease in negative phase with density of the balance bar velocity vector is of the correct amount, then the net velocity vector can remain unchanged in normalized phase and amplitude. This means that the flow sensitivity of the meter can remain unchanged with changing density. FIG. 29 shows how the balance bar second bending amplitude change with density can be adjusted by the frequency separation between the balance bar second resonant frequency and the drive frequency. Thus it is possible, by proper placement of the balance bar second bending resonant frequency, to design a flowmeter having a balance bar whose velocity vector phase changes the proper amount to leave the net velocity vector unchanged with material density change. Such a design produces a single tube Coriolis flow meter that has a flow sensitivity that is not effected by material density.

The present invention therefore has two embodiments. In one embodiment the balance bar second resonant frequency is below the drive frequency and in the other it is above the drive frequency. In both embodiments the balance bar second bending mode is excited by the Coriolis deflections of the flow tube. In both embodiments the amount of excitation of the balance bar is a function of the separation between the second resonant frequency and the drive frequency. In both embodiments a proper separation can be chosen such that the flow sensitivity of the meter will be independent of material density.

Design Details

The preceding description has dealt with the desired relationship of the second bending mode frequency of the balance bar to the first bending mode drive frequency. One embodiment has the frequency of the second bending mode located below the first bending mode drive frequency so that the meter flow sensitivity does not change with material density. Having the second bending mode frequency below the first bending mode drive frequency is a unique situation that some would call impossible. The design details whereby this is accomplished follow.

The two factors that determine resonant frequency of a vibrating structure are mass and spring rate. The equation for resonant frequency is:

$$\omega = \sqrt{\frac{K}{M}}$$

Where:
k=spring rate
M=mass

In order to get the frequency of the second bending mode below the first bending mode (drive) frequency, changes must be made to the conventional balance bar that both raise its first bending mode (drive) frequency and lower its second bending mode frequency. Increasing mass and lowering spring rate (stiffness) both serve to lower frequency. To lower the resonant frequency of the second bending mode so that is lower than the first bending mode drive frequency requires that the mass and stiffness of the balance bar be modified in areas where they have more significance in one mode than the other. Changing the mass in areas of low vibration amplitude has little effect. Likewise changing stiffness, k, in areas of low bending moment has little effect.

Figure 13:
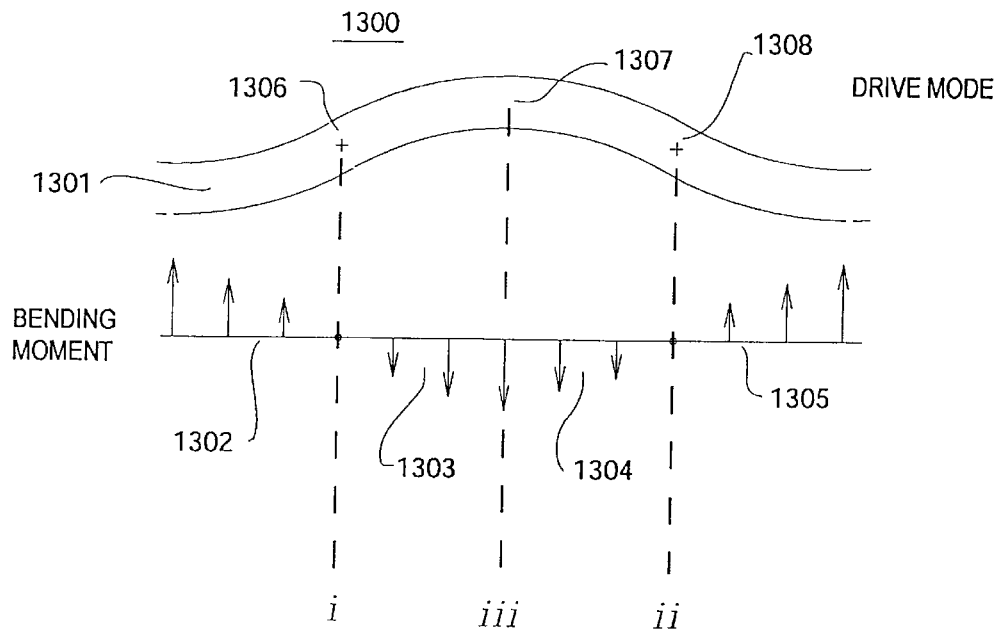
FIG. 13 discloses the mode shape and bending moments of the first bending mode of the balance bar of the present invention.
Figure 14:
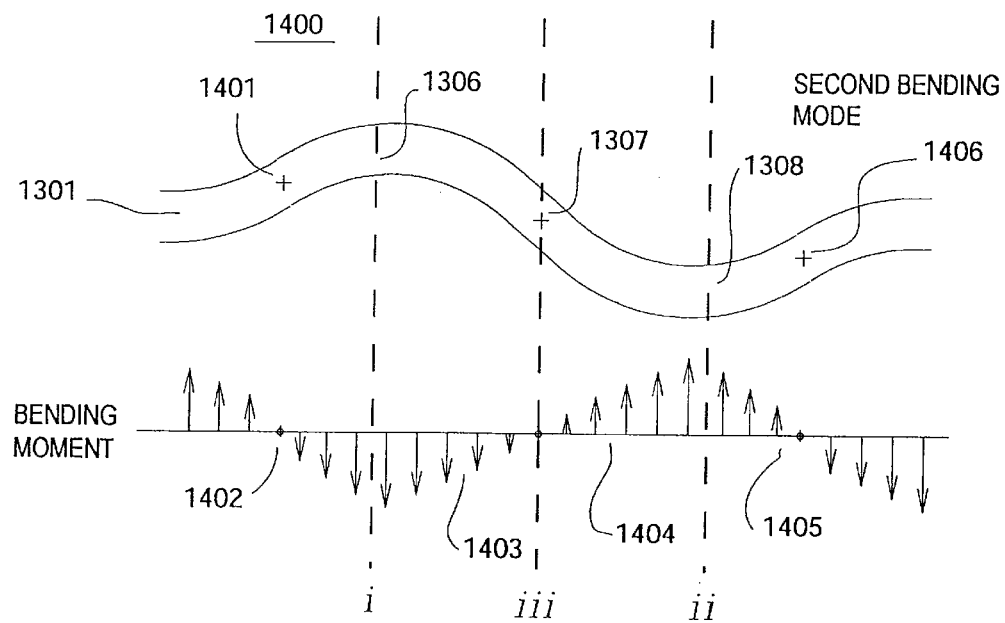
FIG. 14 discloses the mode shape and bending moments of the second bending mode of the balance bar of the present invention.

FIGS. 13 and 14 show the mode shapes and bending moment diagrams of the first and second bending modes of balance bar 1301. In order to soften (lower) k in the second bending mode without softening k in the first bending mode, balance bar 1301 stiffness can be reduced in those areas where its bending moment is near zero in the first bending mode and high in the second bending mode. Dashed lines i and ii of FIGS. 13 and 14 show these two locations to be 1306 and 1308. Lowering the stiffness, k, of balance bar 1301 at locations 1306 and 1308 has little effect on the frequency of the first bending mode of FIG. 13 since the flow tube is relatively straight and has a low bending moment in these locations in the first bending mode. Thus, lowering the stiffness at locations 1306 and 1308 does not effect the first bending mode (drive) frequency. However, as shown on FIG. 14, locations 1306 and 1308 have a high bending moment for the second bending mode. Thus, lowering the stiffness or spring rate of the balance bar at its locations 1306 and 1308 lowers the second bending mode frequency.

The first bending mode frequency of balance bar 1301 can be raised by increasing its stiffness in those areas where it has a high bending moment in its first bending mode and where the second bending mode has a bending moment near zero. Line iii of FIG. 14 shows this location to be 1307. An inspection of FIGS. 13 and 14 indicates that at location 1307, balance bar 1301 has a high bending moment in its first bending mode of FIG. 13 and a low bending moment in its second bending mode of FIG. 14. Thus, a balance bar that has an increased stiffness in area 1307 will have a higher drive frequency while leaving the second bending mode frequency of FIG. 14 unaffected.

To further lower the second bending mode frequency with respect to the first bending mode frequency, the mass of balance bar 1301 can be increased in those areas that have high amplitude in the second bending mode and low amplitude in the first bending mode. This is locations i and ii on FIGS. 13–17. Also, decreasing the mass at the line iii portion of balance bar 1301 on FIGS. 13–17 raises the drive frequency without impacting the second bending mode frequency. Since, as can be seen on FIGS. 13 and 14, the vibration amplitude for the first bending mode is high at location 1307 while the vibration amplitude for the second bending mode is low, as shown on FIG. 14. Thus, removing some of the mass from location 1307 of the balance bar raises the drive frequency but does not affect the second bending mode frequency.

Figure 15:
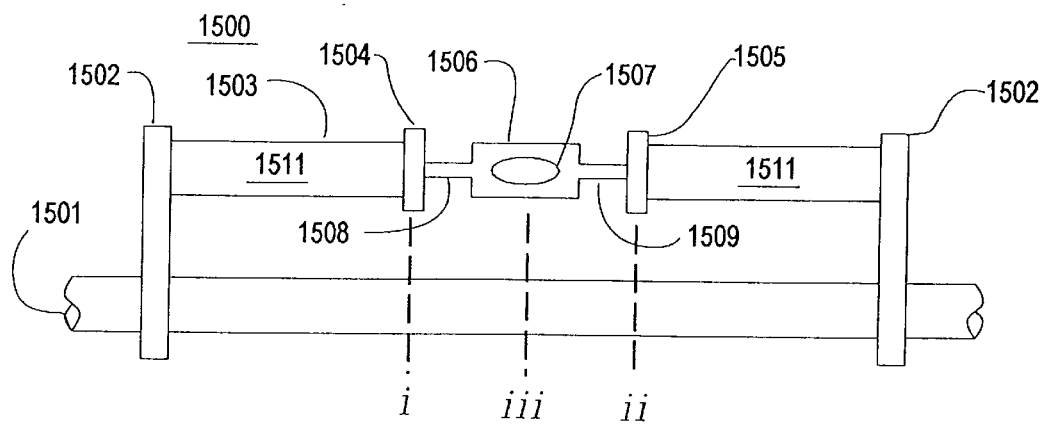
FIG. 15 discloses an embodiment of the present invention.
Figure 16:
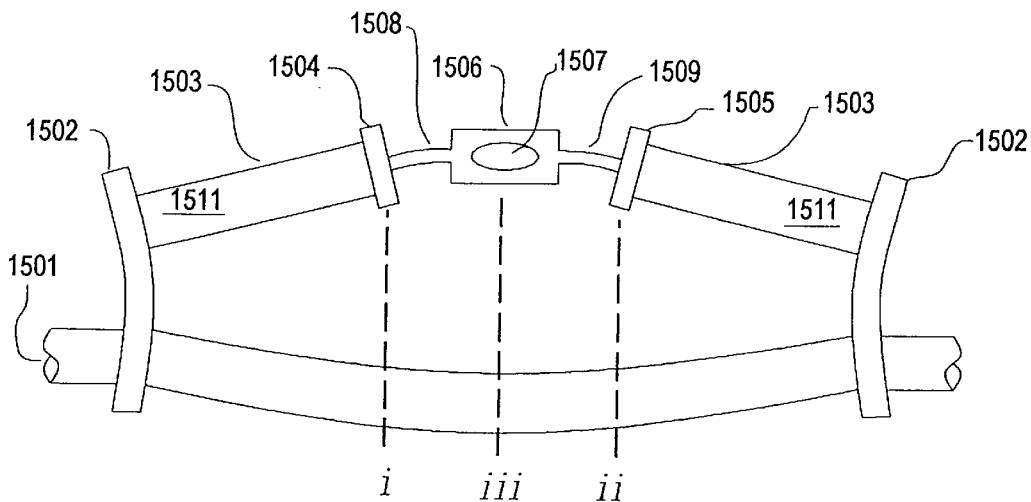
FIGS. 16 and 17 disclose the vibrational response characteristics of the Coriolis flowmeter of FIG. 15.
Figure 17:
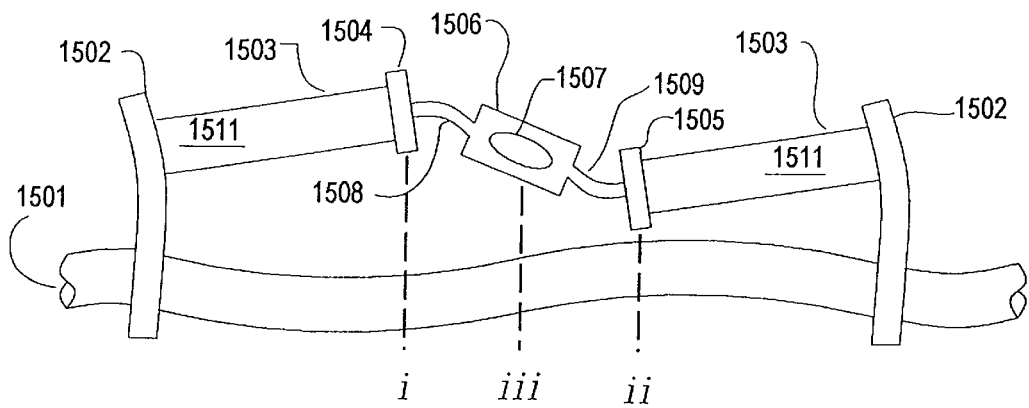

FIG. 15 show an embodiment of this design. Balance bar 1503 stiffness is reduced by removing material from portions 1508 and 1509 on either side of its center region element 1506. This raises the drive frequency only slightly while it lowers the second bending frequency considerably. Mass 1504 and 1505 is also added to the balance bar 1503 outside of the reduced stiffness region 1508 and 1509. This lowers the second bending mode frequency further. Mass is removed from the central portion 1506 of the balance bar 1503 leaving a void 1507. FIG. 16 shows the resulting drive mode shape and FIG. 17 shows the resulting Coriolis-second bending mode shape for the flowmeter of FIG. 15.

Figure 18:
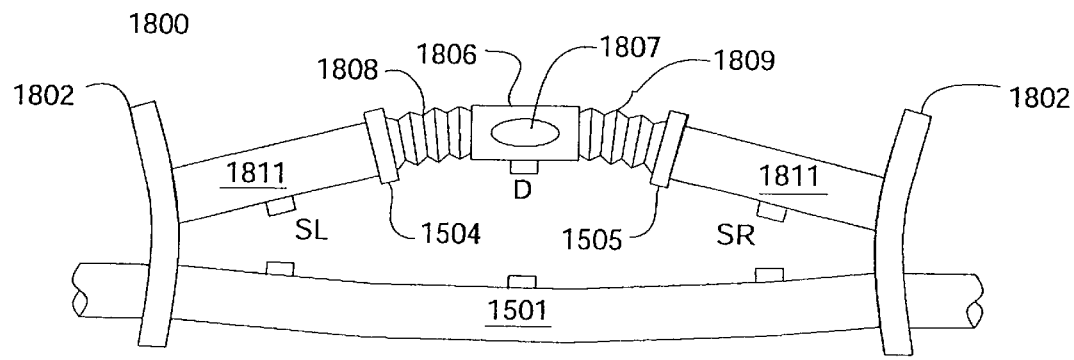
FIG. 18 discloses an alternative embodiment of the Coriolis flowmeter of the present invention.

FIG. 18 shows another embodiment of the invention using bellows 1808 and 1809 to reduce the balance bar stiffness. The embodiment of FIG. 18 is similar to that of FIGS. 15, 16 and 17 in that it has a center element 1806 comparable to element 1506 on FIG. 15. The FIG. 18 embodiment further has a reduced mass area 1807 comparable to element 1507 on FIG. 15. It also has added masses 1504 and 1505 comparable to the added masses of FIG. 15. Flexible bellows 1808 and 1809 on FIG. 18 have reduced stiffness comparable to elements 1508 and 1509 on FIG. 15. These characteristics of the embodiment of FIG. 18 serve to raise the drive frequency and lower the frequency of the second bending mode in the same manner as is the case for the embodiment of FIG. 15.

Figure 19:
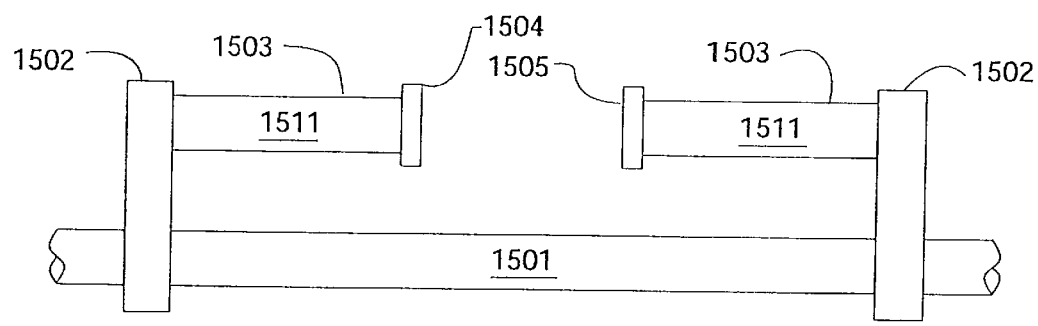
FIGS. 19, 20 and 21 disclose the vibrational characteristics of a conceptual straight tube Coriolis flowmeter.
Figure 20:
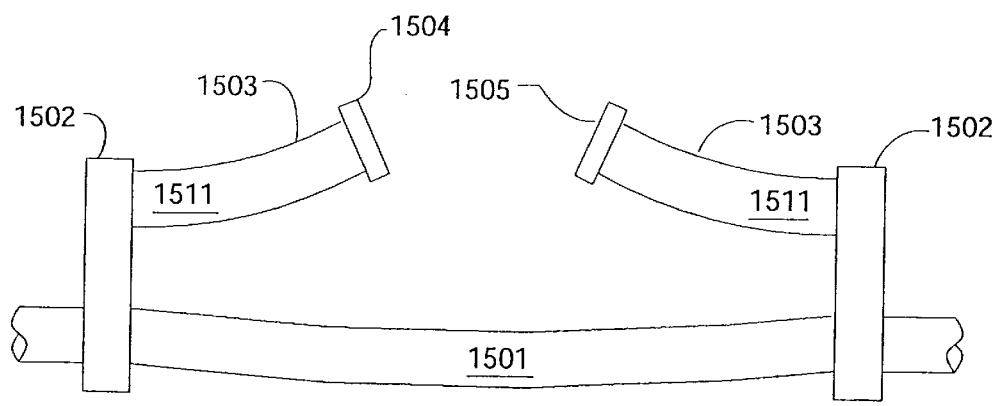
Figure 21:
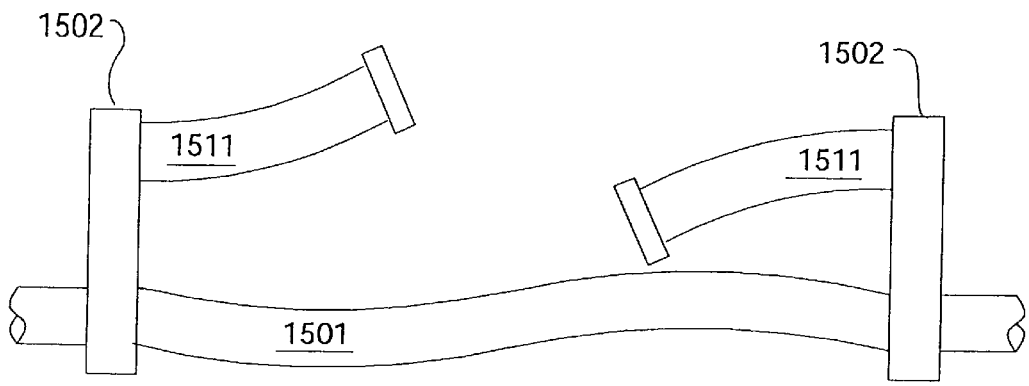

These design features described for FIGS. 15–18 can at best bring the second bending mode frequency of balance bar 1503 down to the first bending mode (drive) frequency. This can be illustrated by assuming that the central section of the balance bar 1503 has no mass and the reduced stiffness areas of the balance bar have no stiffness. In this most extreme case, the central section of the balance bar can be completely neglected and balance bar 1503 behaves like two independent cantilever beams 1511 (FIG. 19). The first bending (drive) mode shape then looks like FIG. 20 and the Coriolis-second bending mode shape looks like FIG. 21. There is no difference in the balance bar shapes between the drive mode and second bending mode except that in the drive mode of FIG. 20, the two balance bar beam ends 1511 are in phase and in the second bending mode of FIG. 21 they are out of phase with each other. Since the bar ends are not connected, their phase relationship with each other makes no difference to their resonant frequencies. Thus the second bending (out of phase) mode of FIG. 21 has a frequency equal to the first bending (in phase) mode of FIG. 20.

The final design feature needed to lower the second bending mode frequency below the drive frequency may be achieved by altering the spring stiffness of the balance bar so that it has less stiffness in the second bending mode than in the first bending mode. The essence of this design feature is that the balance bar is made extremely stiff (except for the two reduced stiffness zones 1508 and 1509 of FIG. 22) so that most of the flexing occurs in brace bar 1502. The net stiffness of balance bar 1503 then becomes a function of the vibration amplitude ratio between balance bar 1503 and flow tube 1501. The balance bar is made stiff in elements 1511. This has the effect of removing the effective spring from balance bar 1503 and concentrating the spring in brace bar 1502 so that the spring is adjacent to the end nodes. Moving the nodal location can then have a significant effect on the effective spring rate of the balance bar.

Figure 22:
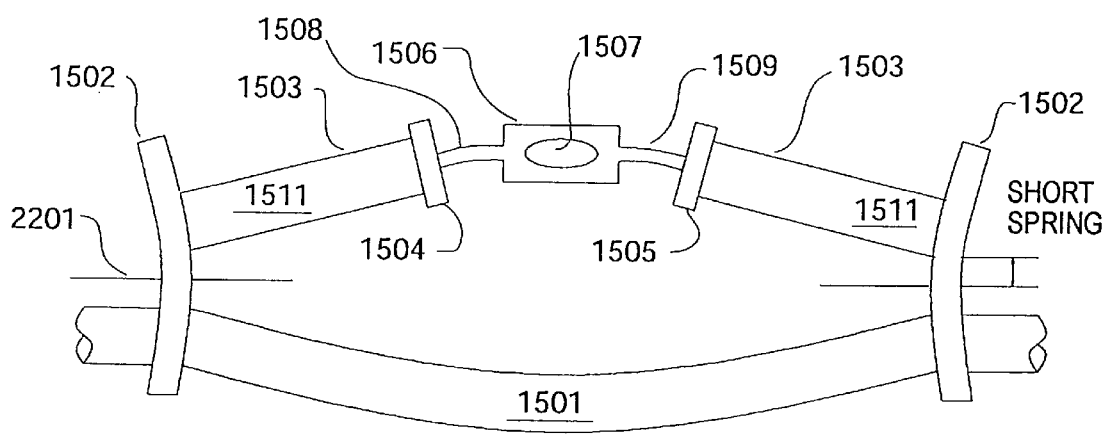
FIGS. 22, 23 and 24 disclose vibrational characteristics of one possible straight tube Coriolis flowmeter of the present invention.
Figure 23:
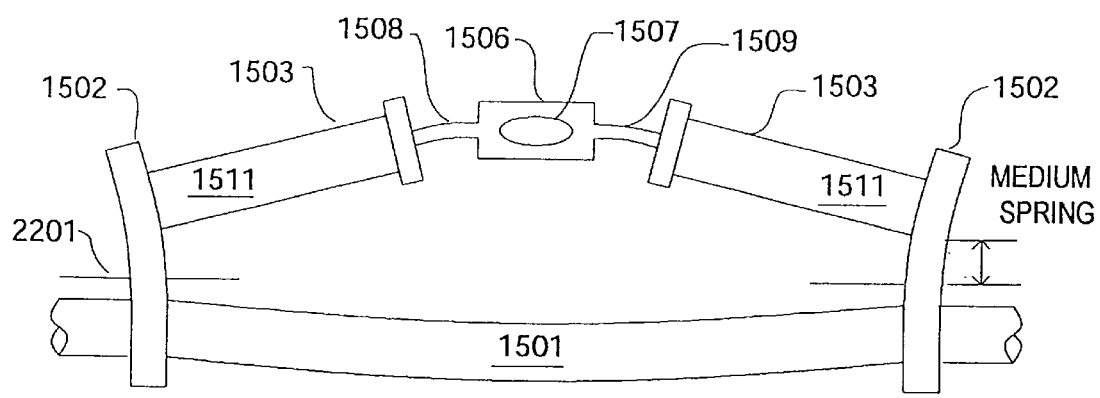

In FIG. 22 flow tube 1501 and balance bar 1503 have equal drive mode vibration amplitudes. FIG. 23 shows the same balance bar drive mode vibration amplitude in conjunction with a near zero flow tube vibration amplitude. In both figures, brace bar 1502 has a stationary node plane 2201 between flow tube 1501 and balance bar 1503. Stationary node plane 2201 is a zero vibration plane and vibrates with neither the flow tube nor the balance bar. In FIG. 22, because of the equal vibration amplitudes, stationary node plane 2201 is located approximately half way between flow tube 1501 and balance bar 1503. In FIG. 23, flow tube 1501 has a much lower vibration amplitude (and a larger mass) and therefore, stationary node plane 2201 in brace bar 1502 is located very near flow tube 1501. As far as the dynamics of the system are concerned, stationary node plane 2201 marks the end of the balance bar 1503 spring region in each brace bar 1502. The shorter effective spring of balance bar 1503 of FIG. 22 gives it a higher effective stiffness than the longer effective spring of balance bar 1503 of FIG. 23. With most of the spring function of balance bar 1503 residing in brace bars 1502, a higher flow tube/balance bar amplitude ratio results in a shorter and stiffer effective balance bar spring region than a lower amplitude ratio. Thus designing the meter so that it has a higher flow tube/balance bar amplitude ratio in the first bending (drive) mode than in the Coriolis-second bending mode can result in the Coriolis-second bending mode having a lower resonant frequency than the first bending (drive) mode. This is explained below.

The vibration amplitude ratio in the drive mode is determined by the mass and stiffness of the two vibrating members. If flow tube 1501 and balance bar 1503 have equal resonant frequencies (and they must for a dynamically balanced flowmeter) then the following relationship is true:

$$\sqrt{\frac{K_t}{M_t}} = \sqrt{\frac{K_{bb}}{M_{bb}}}$$

Also, the law of conservation of momentum holds:

$$M_t V_t = M_{bb} V_{bb}$$

It can be shown from these two laws that the vibration amplitude ratio is the inverse of the mass ratio and also that the mass ratio and stiffness ratio must be equal:

$$\frac{A_t}{A_{bb}} = \frac{M_{bb}}{M_t} = \frac{K_{bb}}{K_t}$$

Therefore, for balance bar 1503 to have a lower vibration amplitude than flow tube 1501, the balance bar needs to have a higher mass and stiffness than the flow tube.

Figure 24:
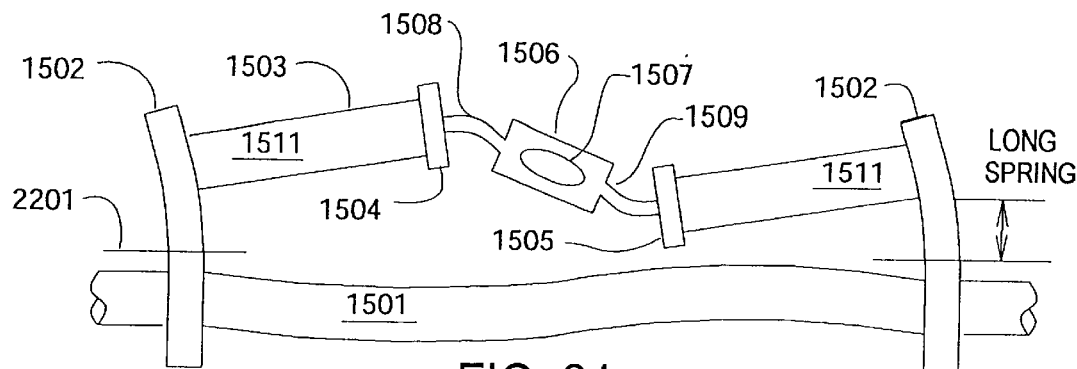

The drive frequency is raised above the Coriolis second bending mode frequency in the following manner. The vibration amplitude ratio in the first bending mode between flow tube 1501 and balance bar 1503 is made high. This is done by making balance bar 1503 and its elements 1511 heavy and stiff compared to flow tube 1501. The result is that the stationary node plane 2201 in brace bar 1502 is close to balance bar 1503. This makes the spring rate of balance bar 1503 (in the drive mode) high. In the Coriolis second bending mode, however, the amplitude ratio is reversed. The flow tube Coriolis deflection amplitude is low because it is not being driven at its resonant frequency by the Coriolis force. The balance bar amplitude in the second bending mode is high because it is being excited by the Coriolis deflection of flow tube 1501 at or near its second bending mode resonant frequency. The flow tube/balance bar vibration amplitude ratio in the Coriolis second bending mode is thus low and results in the stationary node planes being close to flow tube 1501. This makes the balance bar springs relatively long and the balance bar spring rate low in the Coriolis second bending mode. This lowers the second bending mode frequency. The Coriolis second bending mode with the low amplitude ratio is shown in FIG. 24. Because the vibration amplitude ratio is high in the drive mode and is low in the Coriolis second bending mode, the balance bar springs (which reside in brace bar 1502) are stiffer in the drive mode than in the Coriolis second bending mode. This enables the second bending mode to actually have a lower frequency than the first bending drive mode.

In summary, there are four design features that enable the balance bar second bending frequency to be below the drive frequency. The first is that the stiffness is lowered on both sides of its central region 1506. This lowers the balance bar second bending resonant frequency. This is done by elements 1508 and 1509 which are flexible and have a low spring rate. Second, the mass of balance bar 1503 is reduced in its central region 1506 and increased immediately outside of the reduced stiffness regions 1508 and 1509. This raises the drive frequency and lowers the balance bar second bending mode frequency. Third, balance bar 1503 is made stiff in its beam elements 1511 so that much of the spring of the vibrating structure occurs in brace bar 1502. This causes the balance bar spring stiffness to become a function of the vibration amplitude ratio between the flow tube and the balance bar. Fourth, the relative mass and stiffness of flow tube 1501 and balance bar 1503 is such made such that the vibration amplitude ratio (flow tube/balance bar) is higher in the drive mode than in the Coriolis-second bending mode. This allows the balance bar second bending mode to have a resonant frequency slightly less than the first bending (drive) mode. It may not be necessary to employ all of these design features to cause the balance bar second frequency to be below the drive frequency. It is only necessary to employ enough of these features to reduce the balance bar 1503 second bending mode frequency to be below the drive frequency enough that the flow sensitivity of the meter remains independent of material Aug. 26, 1998 (12:36PM) density.

The other embodiment of the present invention, that in which the second bending mode resonant frequency is placed above the drive frequency, is accomplished by use of the same design techniques as described for the first embodiment. The only difference is that the balance bar second bending resonant frequency does not have to be lowered as much. It has to be lowered some because the second bending mode normally has a resonant frequency so much higher than the drive frequency that it is not excited significantly by the Coriolis deflections of the flow tube (which occur at drive frequency). In order to lower the smaller amount for this embodiment it is necessary only to apply a few of the design techniques, or to apply them in moderation.

Figure 25:
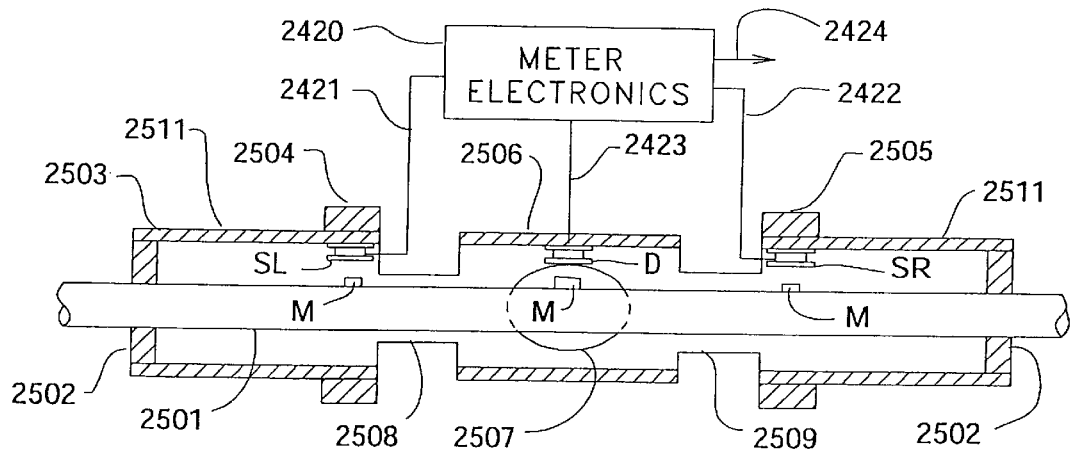
FIG. 25 discloses an alternative embodiment of a Coriolis straight tube flowmeter of the present invention.
Figure 26:
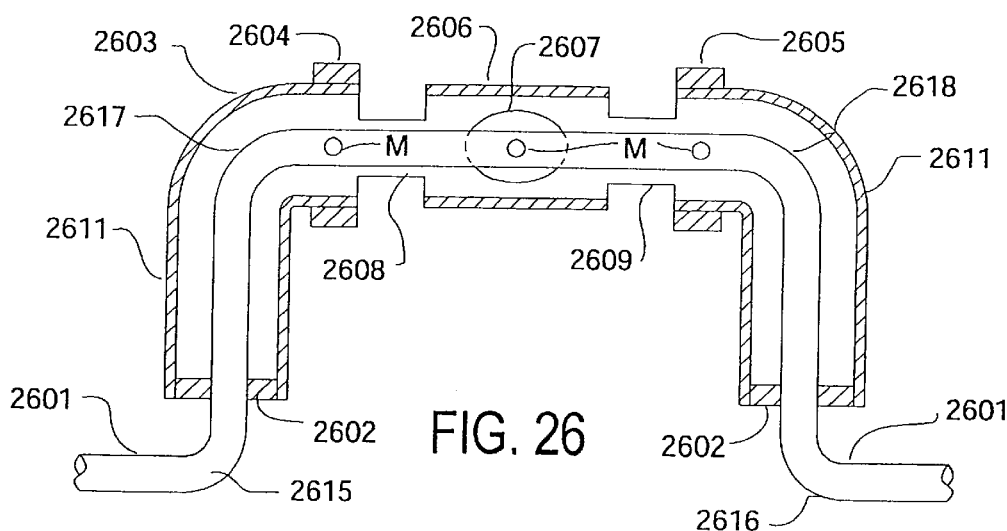
FIG. 26 discloses a Coriolis flowmeter embodying the present invention and having a curved flow tube and surrounding balance bar.

The preceding described embodiments of the invention have the form of a single straight tube with a parallel balance bar beside the flow tube. This has been done only for clarity of the inventive concepts. The principles and design features of the invention apply equally well to a single straight tube Coriolis flowmeter with a concentric balance bar (FIG. 25) as well as to single curved tube flowmeters (FIG. 26) with concentric balance bars. The preferred embodiment is the single straight tube with concentric balance bar of FIG. 25. FIG. 25 and FIG. 26, for clarity, have the balance bar front half removed so that the flow tube can be seen. FIG. 25 is the simplest and most compact embodiment.

The embodiment of FIG. 25 is similar to that of FIGS. 22–24 except that the balance bar 2503 is concentric with and surrounds flow tube 2501. Balance bar 2503 is connected at its ends by brace bars 2502 to flow tube 2501. The center portion of the balance bar 2503 is light weight due to void 2507. Sections 2508 and 2509 are of reduced stiffness. Balance bar 2503 also has added mass elements 2504 and 2505 corresponding to elements 1504 and 1505 on FIGS. 22–24. This design of the embodiment of FIG. 25 permits the second bending mode frequency of balance bar 2503 to be lower than the first bending mode (drive) frequency and provides the same advantages formerly described for the embodiment of FIGS. 22–24.

FIG. 26 discloses embodiment which is similar in most respects to that of FIG. 25 except that flow tube 2601 and its surrounding concentric balance bar 2603 are not straight but instead, are curved upwards from horizontal at portions 2615 and 2616 from which they extend upward until they make the transition from vertical to a horizontal at areas 2617 and 2618. The center portion 2606 of brace bar 2603 has a low mass area 2607 comprising a void and elongated elements 2608 and 2609 which additionally have a low spring rate. Elements 2604 and 2605 provide additional mass in the same manner as do elements 2504 and 2505 of the embodiment of FIG. 25 and in the same manner as do elements 1504 and 1505 in the embodiment of FIG. 22–24.

On FIG. 25, meter electronics element 2420 applies drives signals via path 2423 to driver D which cooperates with an adjacent magnet M to vibrate the flow tube 2501 and balance bar 2503 out of phase with each other at a resonant drive frequency. With material flow in the vibrating flow tube, Coriolis forces are applied to the flow tube to deflect its left-hand portion out of phase with respect to its right-hand portion as is well known in art. These Coriolis deflections are detected by left sensor SL and right sensor SR. Signals representing the Coriolis deflections are applied over paths 2421 and 2422 to meter electronics 2420 which processes the signals in the conventional manner to generate output information pertaining to the flowing material. This information is applied to path 2424 and may include material density, material flow rate, etc. On FIG. 25, driver D, left sensor SL and right sensor SR each comprise the coil/ magnet pair with the magnets being designated M and attached to the flow tube proximate the coil SL, D, and SR of each coil/magnet pair.

The embodiment of FIG. 26 is similarly associated with an electronics element (not shown) comparable to meter electronics 2420. The embodiment of FIG. 26 similarly has a driver D, a left sensor SL and a right sensor SR (all not shown) in the view of FIG. 26 since the flow tube vibrates in a plane transverse to the presentation of FIG. 26. In this view, only the left magnet M associated with sensor SL (not shown) and the center magnet M associated with driver D (not shown) and the right-hand magnet M associated with sensor SR (not shown) may be seen on FIG. 26.

It is to be expressly understood that the claimed invention is not to be limited to the description of the preferred embodiment but encompasses other modifications and alterations within the scope and spirit of the inventive concept.

We claim:

1. A method of operating a Coriolis flowmeter having a flow tube and a balance bar oriented substantially parallel to said flow tube; said method comprising the steps of:

flowing material through said flow tube;

vibrating said flow tube and said balance bar at a drive mode frequency substantially equal to the resonant frequency of said balance bar and said flow tube with material flow;

said drive mode frequency being dependent upon the density of said material flow and changing inversely with a change in density of said material flow;

inducing periodic Coriolis deflections in said vibrating flow tube in response to said material flow;

inducing Coriolis like deflections in said balance bar at said drive frequency in response to said Coriolis deflections of said flow tube;

said Coriolis like deflections define an induced mode of vibration of said balance bar having a resonant frequency sufficiently close to said frequency of said Coriolis deflections of said flow tube to increase the amplitude of said Coriolis like deflections in said balance bar;

said flowmeter being responsive to a change in density of said material flow to maintain a substantially constant flow sensitivity of said flowmeter;

said method further comprising the steps of:

generating signals representing said Coriolis deflections of said flow tube and said Coriolis like deflections of said balance bar and deriving information regarding said material flow in response to said generation of said signals.

2. The method of claim 1 including the step of:

operating said flowmeter to respond to a change in density of said material flow to alter the ratio between the drive mode vibration amplitude of said flow tube and said balance bar to change the flow sensitivity of said flowmeter in a first direction and further to alter the ratio between the Coriolis deflection amplitude of said flow tube and the Coriolis like deflection amplitude of said balance bar to change the flow sensitivity of said flowmeter in a second direction opposite to said first direction;

said changes in said flow sensitivity of said flowmeter in said first direction and in said second direction being effective to achieve a flowmeter flow sensitivity that is substantially independent to changes in material flow density.

3. The method of claim 1 further comprising the steps of:

said Coriolis like deflections of said balance bar having a vibration amplitude that changes inversely with the magnitude of the separation of said drive mode frequency from the resonant frequency of said induced mode of vibration;

operating said flow tube in response to a change in density of said material flow to change said drive mode frequency;

altering the flow sensitivity of said flowmeter in a first direction in response to a change in the ratio of the drive mode vibration amplitude of said flow tube and balance bar resulting from said change in said density of said material flow;

altering the ratio between said Coriolis deflection amplitude of said flow tube and the amplitude of said Coriolis-like deflection of said balance bar in response to said change in drive mode frequency resulting from said change in density of said material flow to alter the flow sensitivity of said flowmeter in a second direction opposite to said first direction;

said changes in said flow sensitivity in said first direction and in said second direction being effective to achieve a substantially constant flow sensitivity of said flowmeter over a range of material flow densities.

4. The method of claim 1 wherein:

said periodic Coriolis deflections of said flow tube being characterized by regions of deflection as well as nodes having no deflection;

said Coriolis like deflections of said balance bar have the same number of nodes as said periodic Coriolis deflections of said flow tube.

5. The method of claim 1 wherein said step increasing the amplitude of said Coriolis like deflections includes the step of inducing Coriolis like deflections in said balance bar with said induced mode having a resonant frequency less than said drive frequency.

6. The method of claim 1 wherein said step of increasing the amplitude of said Coriolis like deflections includes the step of inducing Coriolis like deflections in said balance bar with said induced mode having a resonant frequency greater than said drive frequency.

7. The method of claim 1 wherein said step of increasing the amplitude of said Coriolis like deflections includes the step of extending forces indicative of said periodic Coriolis deflections from said flow tube through brace bar means to said balance bar to induce said induced mode in said balance bar having a resonant frequency equal to said drive frequency.

8. The method of claim 1 wherein said steps of inducing Coriolis like deflections in said balance bar includes the steps of:

flexing ends of said flow tube in response to said periodic Coriolis deflections to flex a first end of said brace bar means; and flexing a second end of said brace bar means in response to said flexing of said first end to induce said Coriolis like deflections in said balance bar.

9. The method of claim 1 further comprising the step of transferring the effective spring of said balance bar from said balance bar to said brace bar means to lower a second bending mode resonant frequency of said balance bar.

10. The method of claim 1 further comprising the step of lowering the resonant frequency of said induced mode of said balance bar by lowering the effective spring of said balance bar.

11. The method of claim 10 further comprising the step of lowering the resonant frequency of said induced mode of said balance bar by the provision of at least one flexible portion of said balance bar together with the provision of increased mass on at least one other portion of said balance bar as well as the provision of a void in at least one portion of said balance bar.

12. The method of claim 1 wherein said method further comprises the step of lowering the resonant frequency of said induced mode of said balance bar by the provision of flexible portions of said balance bar at locations of high bending moment of said balance bar for said Coriolis like deflections.

13. The method of claim 1 further comprising the step of maintaining the end nodes of said vibrating flow tube and said balance bar in brace bar means coupling said flow tube and said balance bar.

14. The method of claim 13 wherein said step of maintaining comprises the provision of stiff sections of said balance bar and flexible sections of said balance bar not comprising a stiff section.

15. The method of claim 1 wherein said drive mode comprises a first bending mode and wherein said Coriolis like deflections comprises the second bending mode of said balance bar.

16. The method of claim 15 further comprising the step of lowering the frequency of said second mode of vibration of said balance bar by the provision of a center portion of said balance bar and a flexible portion on each side of said center portion of said balance bar together with the provision of increased mass on each side of said center portion.

17. The method of claim 15 further including the said step of lowering said resonant frequency of said second bending mode of said balance bar by the provision of flexible portions of said balance bar at locations of high bending moment of said balance bar and increased mass at locations of high vibrational amplitude in said second bending mode.

18. A Coriolis flowmeter having a flow tube adapted to receive a material flow, a balance bar oriented substantially parallel to said flow tube and brace bar means coupling said flow tube with said balance bar; said Coriolis flowmeter further comprising:

drive means for vibrating said flow tube and balance bar at a drive mode frequency proximate the resonant frequency of balance bar and said flow tube with material flow;

said material flow being effective to induce periodic Coriolis deflections in said vibrating flow tube;

means including said brace bar means responsive to said Coriolis deflections of said flow tube for inducing Coriolis like deflections in said balance bar at said drive frequency; said Coriolis like deflections having an amplitude proportional to the amplitude of said Coriolis deflections;

said Coriolis like deflections define an induced mode of vibration of said balance bar having a resonant frequency sufficiently close, but not equal, to said drive mode frequency to vary said amplitude of said Coriolis like deflections in response to a variation in said drive mode frequency;

means responsive to a change in density of said material flow to maintain a substantially constant flow sensitivity of said flowmeter;

means for generating signals representing said periodic Coriolis deflections of said flow tube and said Coriolis like deflections of said balance bar; and means for deriving information regarding said material flow in response to said generation of said signals.

19. The Coriolis flowmeter of claim 18 including:

means for operating said flowmeter to respond to a change in density of said material flow to alter the ratio between the drive mode vibration amplitude of said flow tube and said balance bar to change the sensitivity of said flowmeter in a first direction;

means responsive to a change in said drive mode frequency resulting from said change in density of said material flow to alter the ratio between the Coriolis deflection amplitude of said flow tube and the Coriolis-like deflection amplitude of said balance bar to change the sensitivity of said flowmeter in a second direction opposite to said first direction;

said changes in said flow sensitivity of said flowmeter in said first direction and in said second direction being effective to achieve a substantially constant flowmeter flow sensitivity that is substantially independent of changes in material flow density.

20. The Coriolis flowmeter of claim 18 wherein said Coriolis like deflections of said balance bar having a deflection amplitude that changes inversely with the magnitude of the separation of said drive mode frequency from said resonant frequency of said induced mode vibrations; said flowmeter further comprising;

means responsive to a change in density of said material flow to alter flow sensitivity of said flowmeter in a first direction in response to a change in the drive mode vibration amplitude ratio of said flowtube and balance bar;

means responsive to a change in said density to alter said drive mode frequency;

means to alter flow sensitivity of said flowmeter in a second direction opposite to said first direction in response to a change in the ratio of said Coriolis deflection amplitude of said flow tube to the Coriolis like deflection amplitude of said balance bar resulting from a change in drive mode frequency;

said changes in said flow sensitivity in said first direction and in said second direction being effective to achieve a substantially constant material flow sensitivity of said flowmeter.

21. The Coriolis flowmeter of claim 18 wherein:

said periodic Coriolis deflections of said flow tube being characterized by regions of deflection as well as nodes having no deflection;

said Coriolis like deflections of said balance bar have the same number of nodes as said periodic Coriolis deflections of said flow tube.

22. The Coriolis flowmeter of claim 18 wherein said means for vibrating said balance bar includes means for inducing said Coriolis like deflections in said balance bar at said drive frequency with the resonant frequency of said induced mode being greater than said drive mode frequency.

23. The Coriolis flowmeter of claim 18 wherein said means for inducing said Coriolis like deflections in said balance bar includes means for extending forces indicative of said periodic Coriolis deflections from said at least one flow tube through said brace bar to said balance bar to induce said Coriolis like deflections in said balance bar.

24. The Coriolis flowmeter of claim 18 further comprising means for lowering the resonant frequency of said induced mode of said balance bar to a value proximate but not equal to that of said drive mode frequency.

25. The Coriolis flowmeter of claim 24 wherein said means for lowering comprises added mass in said balance bar in regions of high vibrational amplitude in said induced mode and comprises flexible portions of said balance bar at locations of high bending moment in said induced mode.

26. The Coriolis flowmeter of claim 25 wherein said means for lowering further comprises a rigid center portion of said balance bar and an added mass on each side of said rigid center portion and wherein said means for lowering further comprises flexible portions of said balance bar at locations on either side of said rigid center portion.

27. The Coriolis flowmeter of claim 26 wherein said means for lowering further comprises a void in said center portion for raising said drive frequency.

28. The Coriolis flowmeter of claim 27 wherein said flexible portion comprises bellows.

29. The Coriolis flowmeter of claim 25 further comprising means for reducing the effective spring of said balance bar to reduce the resonant frequency of said induced mode of said balance bar.

30. The Coriolis flowmeter of claim 24 wherein said drive mode comprises a first bending mode and wherein said induced mode comprises a second bending mode.

31. The Coriolis flowmeter of claim 18 further comprising means for concentrating the effective spring of said at least one flow tube and said balance bar in said brace bar.

32. The Coriolis flowmeter of claim 31 wherein said means for concentrating comprises stiff members on said balance bar and flexible members comprising each portion of said balance bar not comprising a stiff member.

33. The Coriolis flowmeter of claim 18 further comprising means for maintaining the end node of said flow tube and balance bar in said brace bar.

34. The Coriolis flowmeter of claim 18 comprising a substantially straight flow tube and a substantially straight balance bar.

35. The Coriolis flowmeter of claim 18 comprising a flow tube having a curved portion and a balance bar having a curved portion.

36. The Coriolis flowmeter of claim 18 wherein said Coriolis like deflections comprise the second bending mode of said balance bar.

* * * * *

UNITED STATES PATENT AND TRADEMARK OFFICE
CERTIFICATE OF CORRECTION

PATENT NO : 5,969,265
DATED : October 19, 1999
INVENTOR(S) : Craig Brainerd Van Cleve, Charles Paul Stack and Gregory Treat Lanham It is certified that error appears in the above-identified patent and that said Letters Patent is hereby corrected as shown below:

Col. 24, line 47
replace "through brace bar means to"
with --through a brace bar means connecting said flow tube to--.

Col. 24, line 51
replace "claim 1"
with --claim 7--.

Col. 24, line 58
replace "first end to induce said Coriolis"
with --first end of said brace bar means to induce said Coriolis--.

Col. 28, line 3
replace "balance bar in said brace bar."
with --balance bar in said brace bar means.--.

Col. 28, line 10
replace "balance bar in said brace bar."
with --balance bar in said brace bar means.--.

Signed and Sealed this

Twenty-eighth Day of November, 2000

Attest:

Attesting Officer

Q. TODD DICKINSON

Director of Patents and Trademarks